(12) United States Patent
Yamaguchi

(10) Patent No.: US 7,866,844 B2
(45) Date of Patent: Jan. 11, 2011

(54) EMISSION DEVICE, SURFACE LIGHT SOURCE DEVICE AND DISPLAY

(75) Inventor: Masao Yamaguchi, Kitamoto (JP)

(73) Assignee: Enplas Corporation, Saitama (JP)

( * ) Notice: Subject to any disclaimer, the term of this patent is extended or adjusted under 35 U.S.C. 154(b) by 134 days.

(21) Appl. No.: 12/380,000

(22) Filed: Mar. 5, 2009

(65) Prior Publication Data

US 2009/0225550 A1    Sep. 10, 2009

(30) Foreign Application Priority Data

Mar. 5, 2008    (JP)    ............................... 2008-054909

(51) Int. Cl.
F21V 5/00    (2006.01)

(52) U.S. Cl. .................. 362/244; 362/217.02; 362/246; 362/326

(58) Field of Classification Search .............. 362/97.02, 362/37.04, 235, 244, 246, 331, 332
See application file for complete search history.

(56) References Cited

U.S. PATENT DOCUMENTS

| | | | | |
|---|---|---|---|---|
| 4,609,978 | A * | 9/1986 | Hsieh et al. | ................. 362/335 |
| 5,415,727 | A | 5/1995 | Gal et al. | |
| 7,284,884 | B2 * | 10/2007 | Ohkawa | ..................... 362/327 |
| 7,348,723 | B2 * | 3/2008 | Yamaguchi et al. | ......... 313/501 |
| 7,352,011 | B2 * | 4/2008 | Smits et al. | .................... 257/99 |
| 7,445,370 | B2 * | 11/2008 | Ohkawa | ..................... 362/617 |
| 7,621,657 | B2 * | 11/2009 | Ohkawa | ................ 362/311.01 |

FOREIGN PATENT DOCUMENTS

| | | |
|---|---|---|
| CN | 1564404 A | 1/2005 |
| EP | 1 617 239 A1 | 1/2006 |
| EP | 2 058 679 A2 | 5/2009 |
| JP | 59-226381 | 12/1984 |
| JP | 63-6702 | 1/1988 |
| JP | 2001-250986 | 9/2001 |
| JP | 2002-49326 | 2/2002 |
| WO | 2009/020214 A1 | 2/2009 |

OTHER PUBLICATIONS

European Search Report mailed Aug. 3, 2009 and issued in corresponding European Patent Application 09154278.7.

* cited by examiner

*Primary Examiner*—Ali Alavi
(74) *Attorney, Agent, or Firm*—Staas & Halsey LLP

(57) ABSTRACT

A light flux control member has a back face provided with a first recess portion and ventilation grooves. Output light of the light emitting element arranged as to correspond to the first recess portion enters into the light flux control member via the first recess portion and ventilation grooves being emitted from a light control emission face of the light flux control member after inner-propagation. Refraction of incident light to second recess portions formed in the ventilation grooves hardly generate inner-propagation light which has travelling directions near to a direction of reference optical axis L. This avoids emission from the light control emission face from providing a ring-like bright part. In addition, heat emitted from the light emitting element can be released at a high efficiency because a space in the first recess portion communicates with the outside of the light flux control member.

18 Claims, 26 Drawing Sheets

EMISSION DEVICE, SURFACE LIGHT SOURCE DEVICE AND DISPLAY

CROSS REFERENCE TO RELATED APPLICATION

This application claims the benefit of Japanese Application No. 2008-54909, filed Mar. 5, 2008 in the Japanese Patent Office, the disclosure of which is incorporated herein by reference.

BACKGROUND

1. Field of Invention

The present invention relates to an emission device, a surface light source device and a display, being applied to various devices such as emission devices or surface light source devices for backlight arrangement of liquid crystal display panel or general uses of illumination, for example, interior illumination. The present invention is also applied to surface light source devices employing emission devices and displays employing combination of emission device and object-to-be-illuminated for displaying.

2. Related Arts

It has been broadly known to employ a surface light source device provided with a plurality of point-like-light-sources as an illumination means for liquid crystal display monitor of devices such as personal computer or television set. A popular point-like-light-source is LED (Light Emitting Diode). According to typical arts, such a surface light source device used for illuminating a LCD-panel of LCD-monitor is provided with a plurality of LEDs and a plate-like light flux control member size and shape of which are generally the same as those of the LCD-panel.

The LEDs are disposed like a matrix on the back face side of the light flux control member. Light from LEDs enters into the light flux control member from the back face side thereof, being emitted an emission face opposite to the back face of the light flux control member after travelling within the light flux control member. The emitted light is supplied to LCD-panel for backlighting. Prior arts disclosed in known documents are as follows.

<First Prior Art>

FIG. 28 is a diagram illustrating an example of skeleton structure of surface light source device employing a plurality of LEDs as primary light source. Such skeleton structure is disclosed in Document 1 noted below. Referring to FIG. 28, surface light source device 100 is provided with a plurality of LEDs 101 and micro-lens-array 102. Micro-lens-array 102 consists of micro-lenses arranged in one-to-one correspondence with respect to LEDs 101. Light from EDs 101 is emitted upward in the illustration through micro-lens-array 102.

<Second Prior Art>

FIG. 29 is a diagram illustrating an example of skeleton structure of emission display employing a LED as primary light source. Such skeleton structure is disclosed in Document 2 noted below. Referring to FIG. 29, emission display 103 is provided with LED 104, concave lens 105 and convex lens 106. Light from ED 104 is converged by convex lens 106 after being diverged by concave lens 105, being emitted to directions generally parallel to an optical axis of LED 104.

<Third Prior Art>

An known display employing a LED is disclosed in Document 3 noted below. FIG. 30 shows an arrangement in display 107 for illumination. The arrangement comprises LED 108, converging lens 110 and diverging lens 111. Light from LED 108 is converged by converging lens 110 to be directed forward, then being diverged by diverging lens 111.

<Fourth Prior Art>

FIG. 31 shows an example of arrangement including an object-to-be-illuminated in a display employing LEDs as primary light source. Referring to FIG. 31, display 121 is provided with a plurality of LED chips 125, light diffusion member 126 and object-to-be-illuminated (such as LCD-panel) 127. Each LED chip 125 is provided with LED 124. Light flux control member 123 provided with a hemisphere emission face 122 is fixed to a light emitting surface side of LED 124. Light from each LED chip is supplied to object-to-be-illuminated (such as LCD-panel) 127 after transmitting light diffusion member 126. Thus object-to-be-illuminated 127 is illuminated two-dimensionally.

<Fifth Prior Art>

FIG. 32 illustrates another example of display employing a LED as primary light source. Such skeleton structure is disclosed in Document 4 noted below. Referring to FIG. 32, matrix-type display 130 is provided with display panel substrate 131, emission elements 132 arrayed thereon like matrix and lens case 133. Lens case 133 is located at a front side of emission elements 132, being mounted as to be in closely contact with display panel substrate 131.

Hemisphere-like projection portions 134 are formed on lens case 133 as to correspond respectively to emission elements 132. Hollow 135 is formed within each projection portion 134 for accommodating emission element 132. Each hollow 135 has a side wall which is formed so refract and take in light from emission element 132 so that light thus taken in is directed to a front side (upward direction in FIG. 32).

In other words, light from emission element 132 impinges only on an inner surface of hollow 135.

Lens case 133 also has gap(s) 136 aground hollow(s) 135 accommodating emission element(s) 132. Light taken in lens case 133 after being emitted sideways from emission element(s) 132 is totally-reflected by slope(s) 137 of gap(s) 136, being directed to a frontal direction. As a result, matrix-type display 130 provide a frontal illumination of an increased brightness.

However, the above-described prior arts involves problems as discussed bellow.

Regarding First Prior Art (Surface Light Source Device 100):

Emission quantity varies rapidly at parts at which configuration of micro-lens arrays 102 is discontinuously changes and intermediate sections between LEDs 101 side by side are formed. This causes boundary areas between micro-lens arrays 102 to provide conspicuous emission brightness unevenness.

Regarding Second Prior Art (Emission Display 103):

Continuously arranged plural concave lenses 105 connected to each other are not employed. Further, continuously arranged plural convex lenses 106 connected to each other are not employed. Accordingly, it is difficult to illuminate a large area size object-to-be-illuminated uniformly in a backlighting arrangement.

Regarding Third Prior Art (Display 107):

Light from LED 108 is affected by converging lens 110 and diverging lens 111 successively. Such successive converging action and diverging action will decrease brightness unevenness as compared with surface light source device 100 (first prior art). However, light from LEDs 108 adjacent to each other is hardly mixed well. Therefore, if LEDs 108 adjacent to each other have emission colors, emission color unevenness between LEDs 108 adjacent to each other tends to be conspicuous.

Regarding Forth Prior Art (Display 121):

Large wave-like brightness unevenness of illumination light appears as to correspond to cyclic locations of LEDs 124. Such phenomenon is illustrated in FIG. 13. This brings dark parts at intermediate sections between LEDs 124 adjacent to each other, rendering uniform illumination difficult. In addition, directions light fluxes outputted from each LED chip 125 tend to gather neighbourhood of an optical axis of LED 124 corresponding to each LED chip 125.

Such phenomenon is like that observed in a case where an object-to-be-illuminated is directly illuminated by an emission element as shown bay curve S3 in FIG. 13. This results in difficulty such that light fluxes from LEDs 124 adjacent to each other are hardly mixed each other and unevenness in emission color is apt to conspicuous.

Regarding Fifth Prior Art (Matrix-Type Display 130):

Brightness of frontal illumination light is large. However, light fluxes from lens cases 133 of emission elements 132 adjacent to each other tend to be hardly mixed together. This brings conspicuous unevenness in emission color. In addition, light H emitted from projection portion 134 of lens case 11133 and light H emitted after being totally reflected by slope 137 of gap 136 give a crossover at a location which would be seen easily by naked eyes. As a result, a ring-like locally bright portion can be generated. Such a ring-like locally bright portion would decrease illumination quality.

Saying further, heat generated by emission elements 132 are hardly released because emission device 138 is completely covered by lens cases 133. Therefore, electric components mounted on LCD-panel substrate 131 is apt to be affected by heat.

In addition, some mounting errors can occur in mounting of lens cases 133 to LCD-panel substrate 131 easily, resulting in generation of a gap between lens cases 133 and LCD-panel substrate 131. Such a gap will increase the possibility such that any light enters into lens cases 133 from parts other than the gap. The fifth prior art fails to overcome such undesirable possibility.

Document 1; Tokkai 2002-49326 (JP: See paragraph 0015 and FIG. 4)

Document 2; Tokkai-Sho 59-226381 (JP: See page 3 left-upper column line 15 to right-upper column line 2 and FIG. 6)

Document 3; Tokkai-Sho 63-6702 (JP: See page 2 right-upper column line 20 to left-lower column line 4 and FIG. 3)

Document 4; Tokkai 2001-250986 (JP: See FIG. 1)

OBJECT AND SUMMARY OF INVENTION

The present invention can be applied to an emission device employing a mode according to which light of an emission element is emitted from a light flux control member, a surface light source device employing the mode in which one or more emission elements are adopted and a display using the surface light source device as an illumination means.

An object of the present invention is to improve such emission device, surface light source device and display so that heat generated by a light emitting element(s) is released at a high efficiency.

Another object of the present invention is to realize uniform two-dimensional illumination and to avoid unevenness in emission color from being conspicuous even if a plurality of light emitting elements are employed as primary light source.

still another object of the present invention is to improve such emission device, surface light source device and display employing a single emission element as primary light source so that light of the emission element can be diverged effectively, smoothly and broadly enough to reach a desired range.

First, the present invention is applied to an emission device comprising a light emitting element, a substrate for mounting said light emitting element and a light flux control member through which light of said light emitting element is outputted.

According to a fundamental feature of the present invention, said light flux control member has a light control emission face controlling light outputting and a back face which is opposite to and in contact with said substrate and said back face being provided with a first recess portion which has an opening edge and is formed at a location corresponding to said light emitting element as to taking light of said light emitting element into said light flux control member and at least two ventilation grooves which provides a sink extending from said first recess portion radially outward along said back face so that said first recess portion communicates with ambiance.

Further, said light control emission face being configured as to meet a condition at least regarding light emitted in a direction range which is within 75° from a maximum intensity light emission direction of said light emitting element, and said condition being that increasing quantity of $\theta 5$ relative to increasing quantity of $\theta 1$, $\Delta\theta 5/\Delta\theta 1$ is larger for light in an angle region near to the reference optical axis as compared with $\Delta\theta 5/\Delta\theta 1$ for light in an angle region remote from the reference optical axis, under definition such that $\theta 1$ is angle of a travelling direction of light within said direction range, on reaching a reaching point on said light control emission face after incidence to said light flux control member, with respect to a line parallel with a reference optical axis of said emission device and emission angle $\theta 5$ is angle of emission from said light control emission face.

Said light control emission face may include a ring-like first emission face which is near to said reference optical axis and concentric with respect to said reference optical axis and a second emission face which is adjacent to and surrounds said first emission face, a connection part between said first emission face and said second emission face corresponding to a point of inflection of said light control emission face.

Said ventilation grooves may be configured as to have a rectangle-like cross section shape on a plane perpendicular to both a ventilation groove running direction and said back face.

Alternatively, said ventilation grooves may be configured as to have an arc-like cross section shape on a plane perpendicular to both a ventilation groove running direction and said back face.

Said ventilation grooves may have a constant depth from an inner end portion at a side of said first recess portion to an outer end portion at a side of ambience as to have groove bottoms parallel with said back face.

Said light emission control face may be configured as to meet the following conditions (A) to (C) so far as angularly out of a neighbour of said reference optical axis, (A) $\{\theta 5/\theta 1\} > 1$ is satisfied;

(B) $\theta 5$ gets larger with increasing of $\theta 1$, and (C) increasing quantity of $\theta 5$ relative to increasing quantity of $\theta 1$ gets smaller as $\theta 1$ gets larger.

Said groove bottoms of said ventilation grooves may have a second recess portion provided with a circle-like plan shape having a center according with said reference optical axis, said second recess portion being configured as to prevent light of said light emitting element from being refracted as to come nearer to said reference optical axis on incidence to said second recess portion.

It is noted that said second recess portion may be configured as to meet the following conditions (1) to (4), (1) said second recess portion has a triangle-like sink cross section shape on a plane which includes said reference optical axis and passes said outer end portion;

(2) said second recess portion consists of a first slope and a second slope, said first slope being provided with a circle-like plan shape, being near to said first recess portion and being inclined so that sink quantity with respect to said groove bottoms gets greater gradually with an increasing distance from said recess portion;

(3) said second slope is provided with a circle-like plan shape, remote from said first recess portion and bridges an end portion of said first slope to said groove bottoms;

(4) said first slope is cross-section-configured on said plane as to accord with or sharper than an inclined line passing an light emitting center of said light emitting element and the other end portion of said first slope so that light of said light emitting element is not hindered from being incident to said second slope on reaching said second recess portion.

Said groove bottoms of said ventilation grooves may have a second recess portion provided with a surface for taking light of said light emitting element into said light flux control member, said second recess portion being configured as to prevent light of said light emitting element from being refracted as to come nearer to said reference optical axis on incidence to said second recess portion.

It is noted that said second recess portion is configured as to meet the following conditions (1) to (4), (1) said second recess portion has a triangle-like sink cross section shape on a plane which includes said reference optical axis and passes said outer end portion;

(2) said second recess portion consists of a first slope and a second slope for taking light of said light emitting element into said light flux control member, said first slope being near to said first recess portion and being inclined so that sink quantity with respect to said groove bottoms gets greater gradually with an increasing distance from said recess portion;

(3) said second slope is remote from said first recess portion and bridges an end portion of said first slope to said groove bottoms;

(4) said first slope is cross-section-configured on said plane as to accord with or sharper than an inclined line passing an light emitting center of said light emitting element and the other end portion of said first slope so that light of said light emitting element is not hindered from being incident to said second slope on reaching said second recess portion.

Further, said first slope may be cross-section-configured on said plane as to accord with an inclined line passing an light emitting center of said light emitting element and the other end portion of said first slope, and said second slope may be formed as to be generally perpendicular to said first slope.

Said first slope may be cross-section-configured on said plane as to accord with an inclined line passing an light emitting center of said light emitting element and the other end portion of said first slope, and said second slope may be formed as to be generally perpendicular to said first slope.

A plurality of said second recess portions may be formed successively along said ventilation grooves from an opening edge of said first recess portion near to said groove bottoms, said second recess portions, except for the innermost second recess portion adjacent to said opening edge of said first recess portion near to said groove bottoms, being configured the same as or similarly to said or the innermost second recess portion.

Next, the present invention is applied to a surface light source device comprising an emission device and a light diffusion member diffusing light outputted from said emission device. According to the present invention, the surface light source device employs any of the above emission devices.

The present invention is also applied to a display comprising a surface light source device and an object-to-be-illuminated for displaying illuminated by light outputted from said surface light source device. According to the present invention, the display employs any surface light source device in accordance with the present invention.

According to operation of devices in accordance with the present invention, the following advantages are obtained.

(a) Air warmed in a first recess portion by heat generated by a light emitting element during being switched on can be exhausted to ambience through ventilation grooves formed on a back face of a light flux control member. As a result, the light flux control member and substrate on which the light emitting element is mounted avoid from being affected by increased temperature. This prevents the light flux control member and substrate from having troubles.

(b) Since almost the whole of a back face of a light flux control member except for ventilation grooves is closely in contact with a substrate on which the light emitting element is mounted, light shielding is performed well. This means that almost all of the light that is emitted from the light emitting element and enters into the light flux control member is taken into the light flux control member through a first recess portion. Only a little part of the light is taken into the light flux control member through groove bottoms of the ventilation grooves. Therefore, in cases where the whole area of a back face of a light flux control member can function as an incidence face, appearance of ring-like locally bright part is avoided from being caused by entering of light via areas other than a first recess portion.

In addition, inner-propagation light obtained by taking light from a light emitting element into the light flux control member can be outputted at a high efficiency so that the outputted light flux is rendered well and smoothly expanded to a desirable range.

(c) Accordingly, in cases of employing a plurality of emission elements as primary light source, light from the respective emission elements can be mixed easily. This prevents illumination light emitted from the light flux control member from showing conspicuous illumination color unevenness even if unevenness in emission color exists among the emission elements.

(d) Light of a light emitting element can be prevented from being refracted as to come nearer to a reference optical axis on incidence to ventilation grooves by employing ventilation grooves provided with a second recess portion. As a result, locally bright portions are prevented more effectively from being provided by output emission from a light flux control member as compared with cases where ventilation grooves provided with no second recess is formed on a back face of a light flux control member. This brings much improved illumination quality.

BRIEF DESCRIPTION OF DRAWINGS

FIG. 26 illustrates ventilation grooves of a eighth modification, giving a cross section view of a light flux control member provided with the same ventilation grooves illustrated in a similar way to FIG. 24a;

EMBODIMENT

Described below is on embodiments in accordance with the present invention.

<Outlined Structure of Surface Light Source Device and Display>

Figure 1:
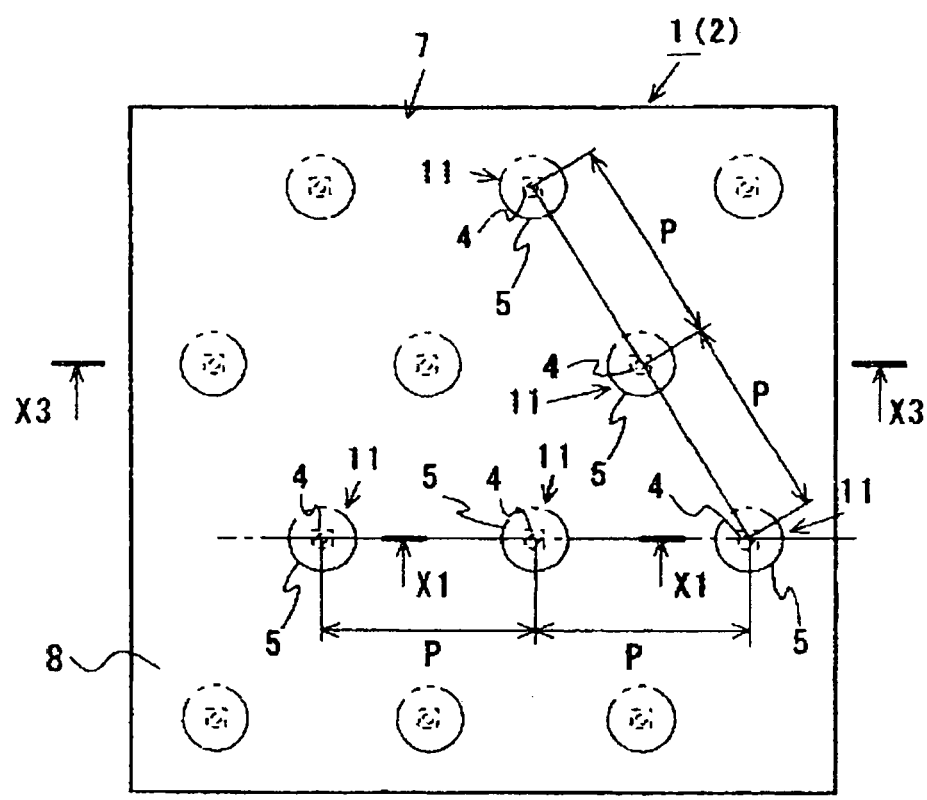
FIG. 1 is a plan view of a surface light source device and a display provided with the same to which the present invention can be applied, with a object-to-be-illuminated and a light diffusion member being not shown.
Figure 2:
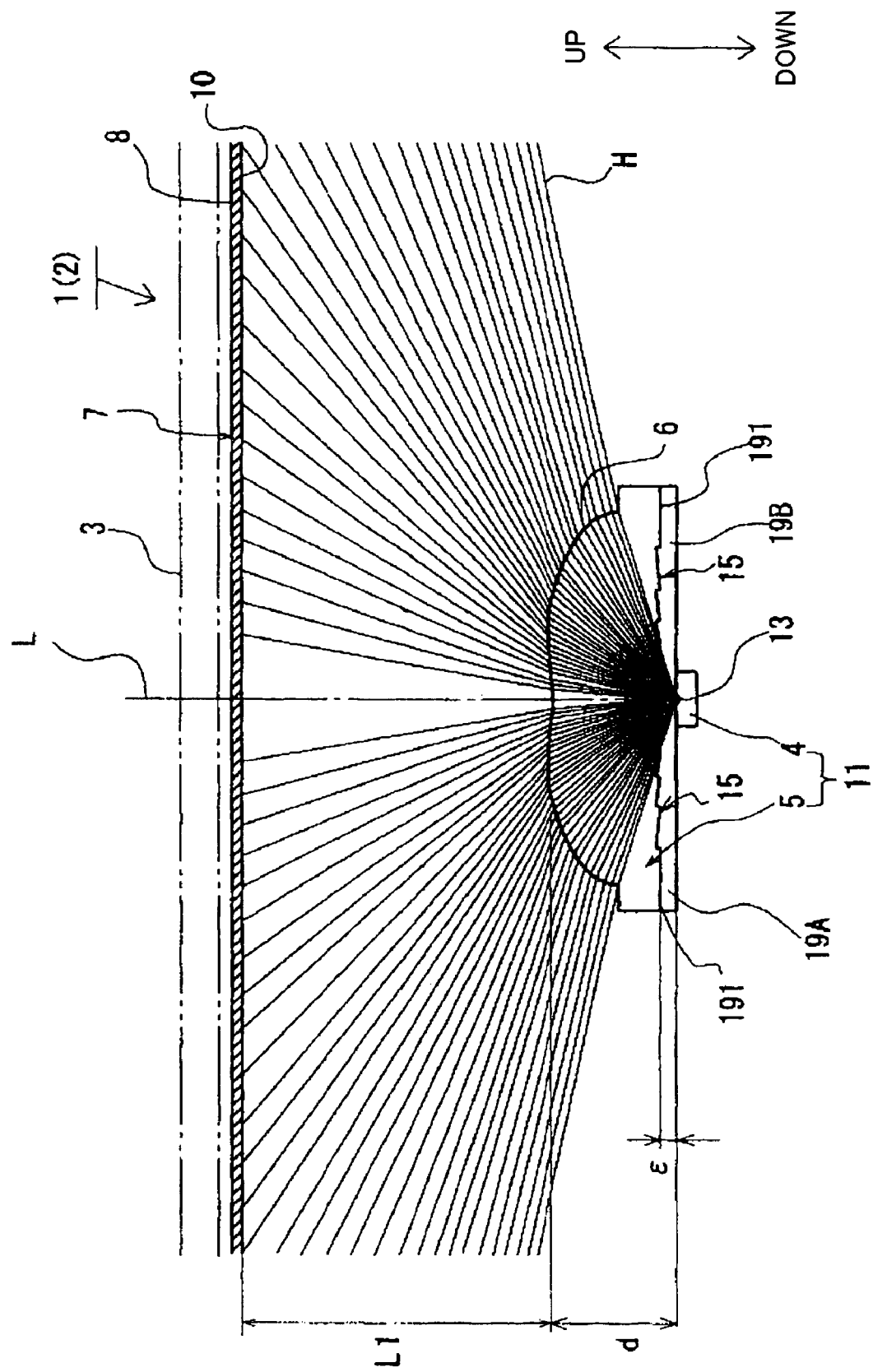
FIG. 2 is an outlined cross section view of display 1 along line X-X in FIG. 1.
Figure 3:
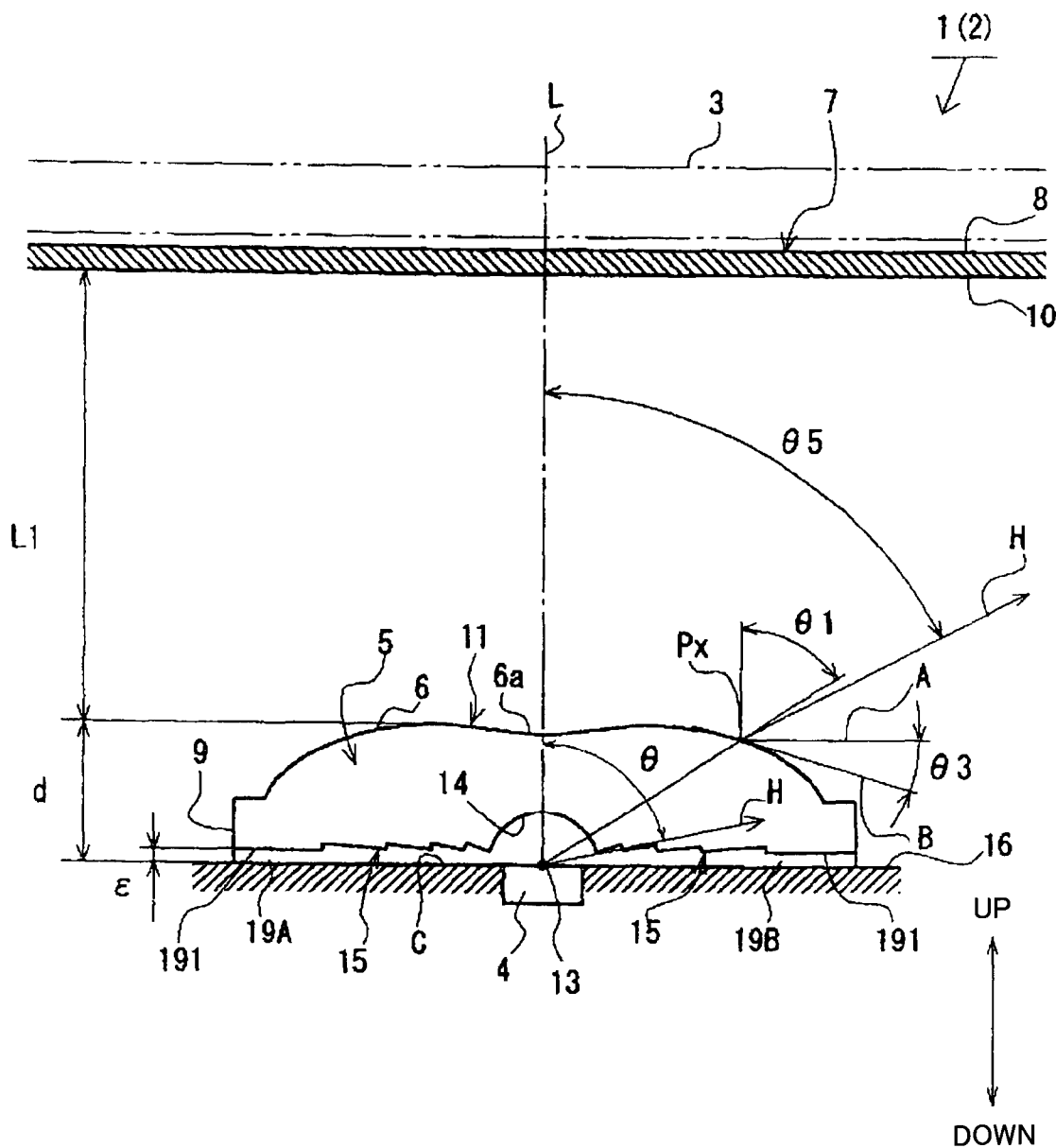
FIG. 3 is a partial cross section view of the display along a cross section including optical axis of a LED, giving a partially enlarged illustration of FIG. 2.

FIGS. 1 to 3 illustrate display 1 and surface light source device 2 employed therein, which are in accordance with the present invention. FIG. 1 is a plan view of surface light source device 2. In other words, a plan view of display 1, with elements including a object-to-be-illuminated (such as LCD-panel) 3 being removed. FIG. 2 is an outlined cross section view of display 1 along line X-X in FIG. 1. FIG. 3 is a partially enlarged cross section view of display 1 shown in FIG. 2 along a cross section including an optical axis of emission element 4, giving an illustration of configuration of light control emission face 6 of light flux control member 5.

It is noted that the term "reference optical axis L" is defined as "light travelling direction at a center of a three-dimensional emission flux emitted from an emission device". In addition, "optical axis of emission element 4 is defined as "light travelling direction at a center of a three-dimensional emission flux emitted from emission element 4". Described is on cases where each optical axis of emission element 4 accords with reference optical axis L. Accordingly, reference optical axis L may be expressed by "optical axis L" hereafter.

Referring to FIGS. 1 to 3, display 1 comprises a plurality of emission elements (point-like-light-sources such as LEDs) 4 as primary light source, light flux control member 5, plate-like light diffusion member 7 and object-to-be-illuminated 3. According to the embodiment, surface light source device 2 is constituted by emission elements 4, light flux control member 5, light diffusion member 7. Emission device 1 is constituted by emission elements 4 and light flux control member 5.

Light diffusion member 7 has a rectangular plan shape, being provided with an emission face (front face) 8 and back face 12 as major faces. Emission elements 4 are disposed at generally constant intervals (at generally constant pitch) along back face side of light diffusion member 7 together with light flux control member 5. Object-to-be-illuminated 3 is disposed at front side of light diffusion member 7.

<Light Flux Control Member>

(1) Outlined Configuration and Mounting State)

Figure 4A:
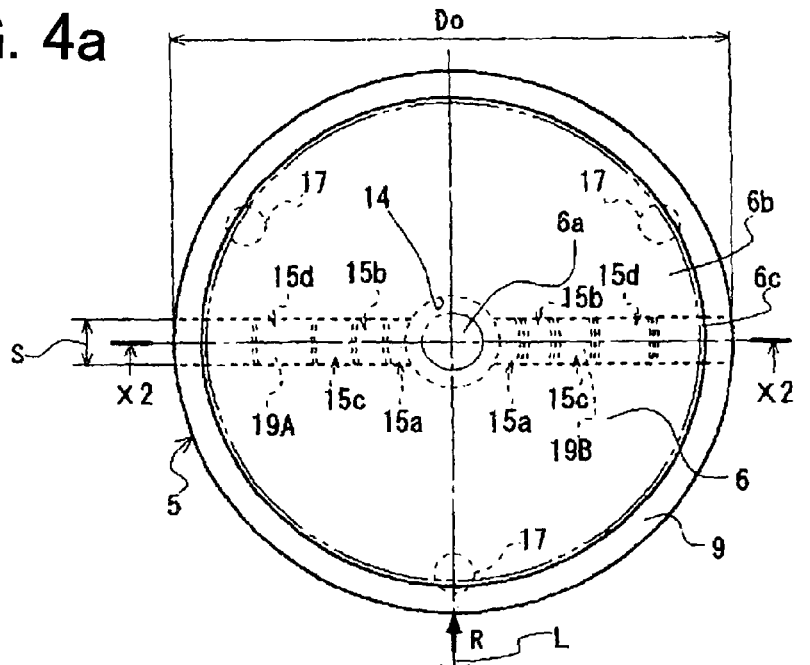
FIGS. 4a to 4c illustrate details of a light flux control member employed in an embodiment in accordance with the present invention, FIG. 4a being a plan view, FIG. 4b being a cross section view along line X2-X2 in FIG. 4a, and FIG. 4c being a partially enlarged illustration of a part of back side of the light flux control member (a part of FIG. 2)
Figure 4B:
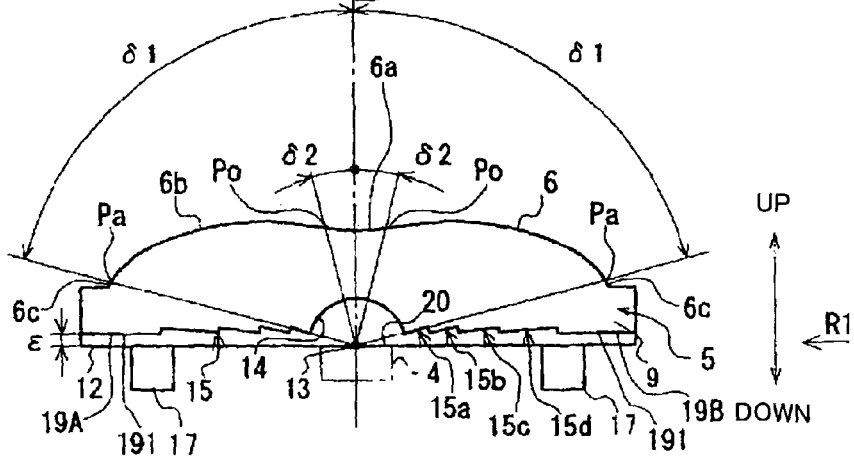

Light flux control member 5 is configured as illustrated in FIGS. 1 to 3, being made of transparent resin material such as PMMA (polymethyl methacrylate), PC '(polycarbonate) or EP (epoxy resin), or transparent glass. As shown in FIG. 4a, light flux control member 5 has light control emission face 6 and generally ring-like flange portion 9. light control emission face 6 has a generally circular plan shape. Ring-like flange portion 9 is formed as to projects toward the outside of light control emission face 6. As shown in FIG. 4b, light control emission face 6 is formed as to project upward as compared with flange portion 9.

Now, for the sake of description, emitting point 13 is defined as a point at which optical axis L and an upper face (emitting surface) 20 of emission element 4 cross. On the side of back face 12 of light flux control member 5 are formed recess portions 14 as first recess portions. As shown in FIG. 4b. each recess portion 14 is located as to correspond to each emission element 4. Recess portion 14 is configured like a hemisphere a center of which is emitting point 13, having radius of r1.

Figure 4C:
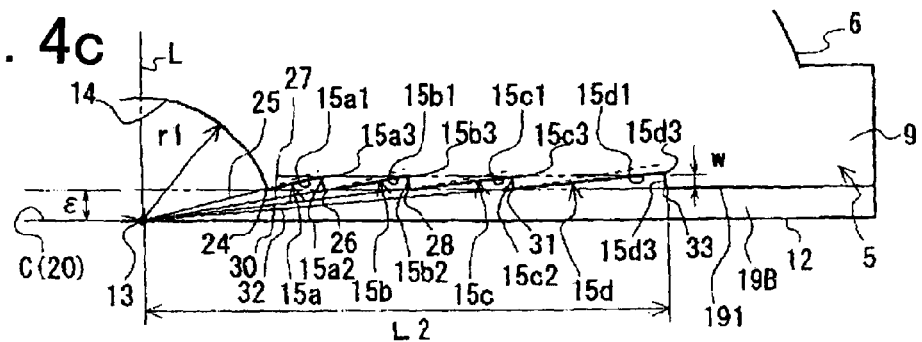
Figure 6:
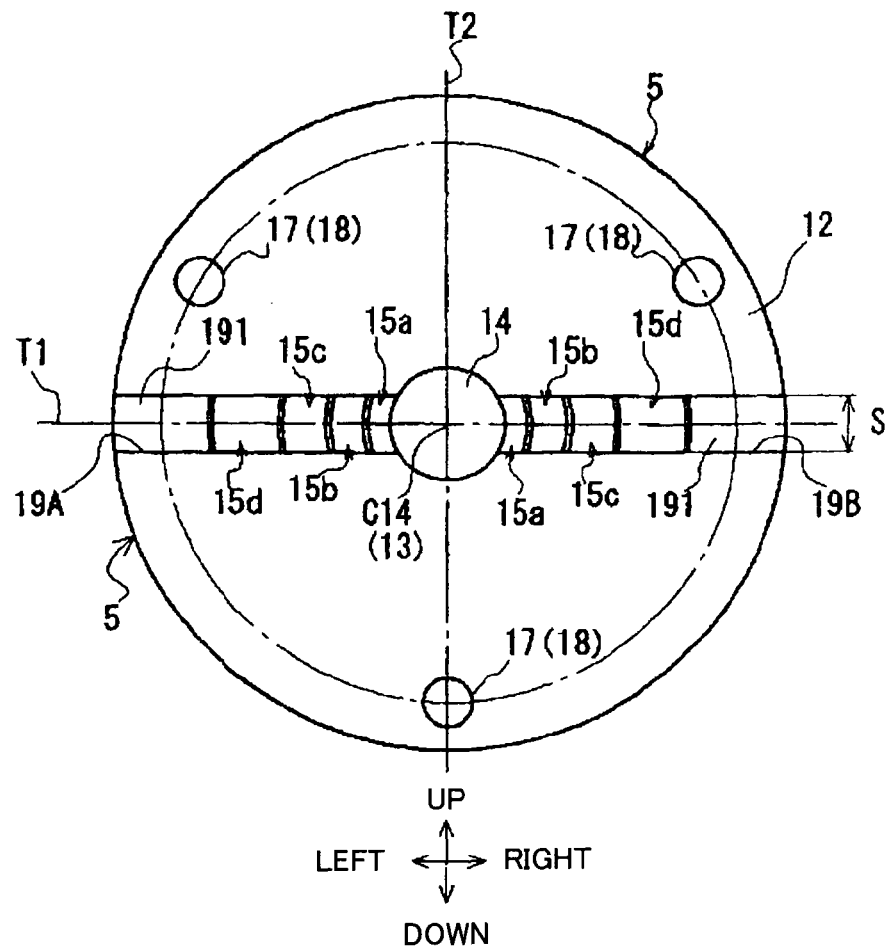
FIG. 6 is a back side view of a light flux control member employed in the embodiment in accordance with the present invention.

As shown in FIGS. 4a to 4c, a pair of ventilation grooves 19A and 19B are formed on the side of back face 12 of light flux control member 5 as to run radially outward from first recess portion 14. As illustrated in FIG. 6, ventilation grooves 19A and 19B are formed along line T1 passing center C14 of recess 14. Each of ventilation grooves 19A, 19B is configured as to be right-and-left-symmetric with respect to line T2 which passes center C14 of recess 14 and runs perpendicular line T1 and to be up-and-down-symmetric with respect to line T1 passing center C14 of recess 14.

Figure 5:
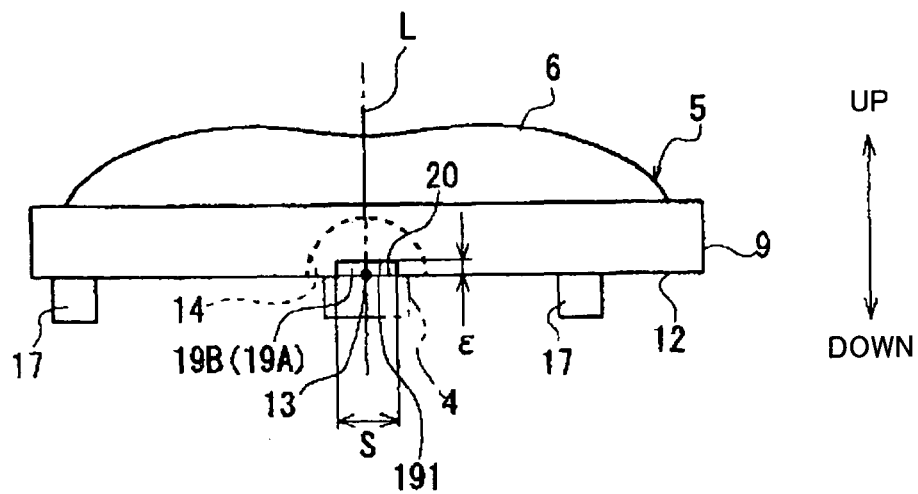
FIG. 5 is a side view of the light flux control member as viewed from R1-direction in FIG. 4b.

Each of ventilation grooves 19A, 19B has a rectangle-like cross section shape on a plane (an imaginary plane set for description) perpendicular to line T1 (radially direction to which ventilation grooves 19A, 19B extend), being configured as to sink from back face 12 of light flux control member 5 (See FIGS. 5 and 6). Further, an end of each of ventilation grooves 19A, 19B is opened to recess 14 and the other end of each of ventilation grooves 19A, 19B is opened to ambience of light flux control member 5, with the result that recess 14 communicates with ambience of light flux control member 5 through ventilation grooves 19A, 19B. Depth (quantity of sinking) ∈ of each of ventilation grooves 19A, 19B is kept constant between both ends.

It is to be noted that air flow from one of a pair of ventilation grooves 19A or 19B to the other of the same pair 19B or 19A via recess 14 is not hindered by closely contact state between substrate 16 and back face 12 of light flux control member 5.

Referring to FIGS. 4a to 4c again, ventilation grooves 19A, 19B have groove bottoms 191 provided with a plurality of in-groove-recess-portions 15a to 15d which are successively formed as to give circle-like plan shapes concentric with recess 14. For the sake of description, these in-groove-recess-portions 15a to 15d are called "second recess portion" or "second recess portion 15".

Figure 7:
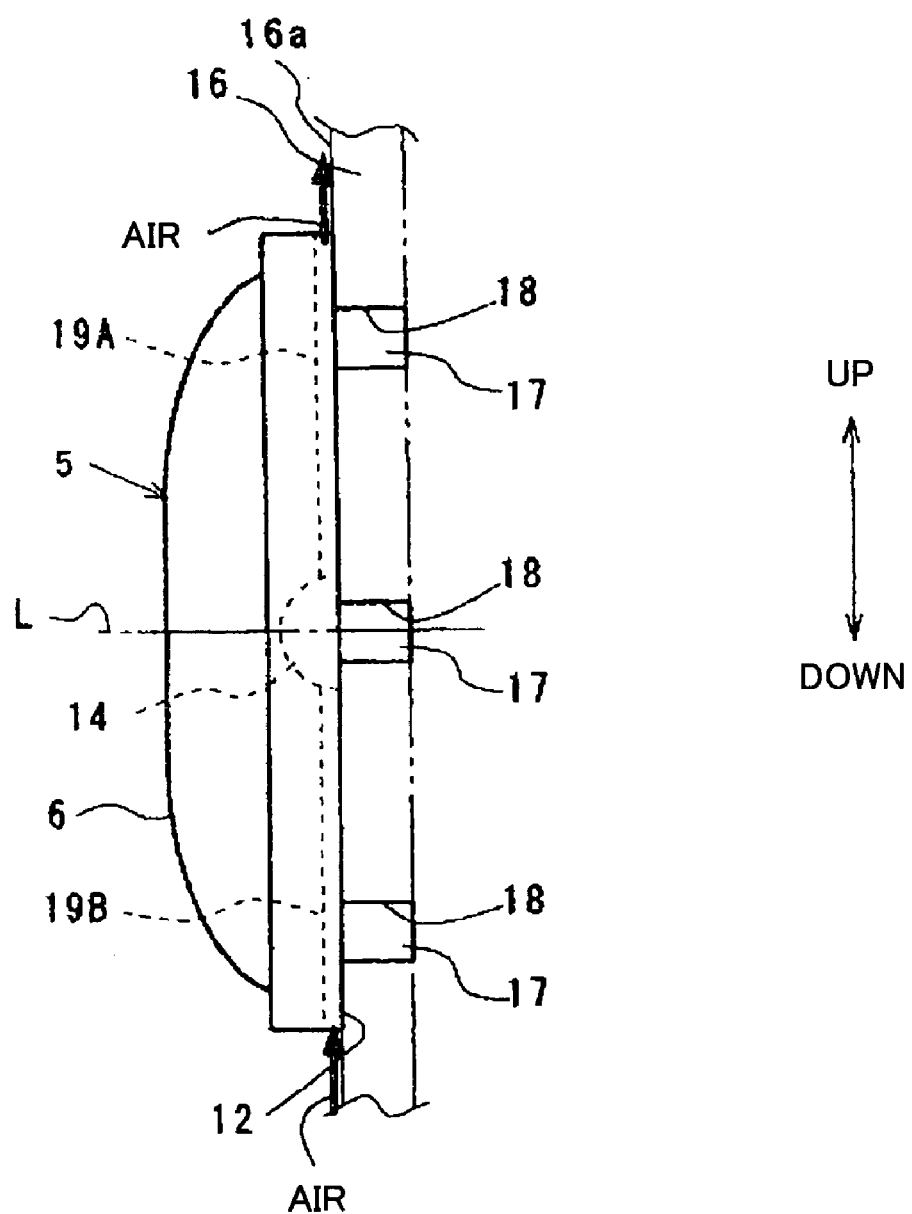
FIG. 7 illustrates a mounting state of the light flux control member.

Next, referring to FIGS. 4a, 6 and 7, in-groove-recess-portion 15d is located at the outermost on the side of back face 12 of light flux control member 5.

Three round-rod-like feet 17 are formed at the radially outside of in-groove-recess-portion 15d for mounting light flux control member 5 to substrate 16 at a positioned location. Three round-rod-like feet 17 are arranged at a constant interval along a periphery direction and on a circle concentric with the outermost in-groove-recess-portion 15d.

Feet 17 are able to be fit into mounting holes 18 opened toward upper face 16a (opposite to light flux control member 5) of substrate 16. Arranging interval of feet 17 may be changed as required, such as depending on locations of mounting holes 18.

As shown in FIGS. 5 to 7, three mounting holes 18 are disposed at a constant interval on a circle having a center according with light emitting point 13 of light emitting element (emission element) 4. Light flux control member 5 can be secured as to be positioned with respect to emitting point 13 of emission element 4 by causing feet 17 to be engaged into mounting holes 18.

It is noted that both center C14 of light flux control member 5 and light emitting point 13 are located on optical axis L under positioning state.

It is also noted that "close-fit" may be applied to fitting of feet 17 into mounting holes 18 or adhesive may be applied to fixing of feet 17 to mounting holes 18 if the device is used under circumstance tending to cause light flux control member 5 to fall away from substrate 16.

Light flux control member 5 is mounted to substrate 16 so that back face 12 is closely in contact with upper face 16a of substrate 16. This brings a state such that space in recess portion 14 surrounding emitting surface 20 of light emitting element 4 communicates with ambience via ventilation grooves 19A, 19B (See FIGS. 5 to 7).

In some cases in practical uses, substrate 16 to which light flux control member 5 is mounted may keeps standing-up posture so that a pair of ventilation grooves 19A, 19B are arranged at upper and lower positions with respect to recess portion 14, as illustrated in FIG. 7. In such cases, air within recess portion 14 is heated by light emitting element 4 and becomes lighter, moving into upper ventilation groove 19A. As a result, air pressure within recess portion 14 decreases and air enters from ambience into recess portion 14 through lower ventilation groove 19B. This flow occurs without interruption during switching-on of light emitting element 4. Air flow is guided into upper ventilation groove 19A after entering into recess portion 14 through lower ventilation groove 19B, then outgoing toward ambience. Such natural convection of air prevents temperature in recess portion 14 from rising.

An experiments was carried out to compare temperature rising in a space of recess portion 14 provided with ventilation grooves 19A, 19B (according to the embodiment) with that in a space of recess portion 14 of comparison reference provided with no ventilation groove (under closed ventilation grooves 19A, 19B). Under the same time of lighting of light emitting element 4, the embodiment gave a result of 33 degree (° C.) while comparison reference gave a result of 57 degree (° C.). This demonstrates a remarkable heat releasing effect.

Standing-up posture in practical uses as shown in FIG. 7 is preferable because natural convection of air occurs smoothly without preparing enforced air flow bay, for example, fan. In other words, it is preferable that one of a pair of ventilation grooves 19A, 19B is located above the other of the same pair in practical uses.

However, it is noted that the present invention does not limit posture of light flux control member 5 so far as ventilation is performed by ventilation grooves 19A, 19B. Ventilation promoting or enforcing means such as fan may be used to promote or enforce ventilation through ventilation grooves 19A, 19B.

(2) Details of Light Control Emission Face of Light Flux Control Member

Light control emission face 6 of light flux control member 5 consists of first emission face 6a and second emission face 6b. First emission face 6a occupies a predetermined area through a center of which optical axis L extends. Second emission face 6b is formed around first emission face 6a as to be continuously connected to first emission face 6a.

As understood from surface configuration illustrated in FIG. 4b, first emission face 6a has a curved surface sinking downward smoothly, namely, a downward-convex smooth curve, providing a recess shape like a shape which is obtained by cutting out and picking up a part of sphere.

On the other hand, second emission face 6b has a smoothly curved upward-convex surface which is adjacent to first emission face 6a. As shown in FIG. 4a, second emission face 6b has a ring-like plan shape surrounding first emission face 6a. First emission face 6a and second emission face 6b are connected smoothly to each other, providing a connection portion corresponding to point of inflection Po. In other words, point of inflection Po is located at boundary portion between first emission face 6a and second emission face 6b.

As shown in FIG. 4b, a curve showing profile of first emission face 6a and another curve showing profile of second emission face 6b meet at point Po and are connected there to each other. Thus point Po is an inflection point of a continuous curve giving a cross section profile (surface configuration) of light control emission face 6.

Referring to FIGS. 4a and 4b again, third emission face 6c is formed at periphery side of second emission face 6b as to provide a bridging portion between second emission face 6b and flange portion 9. It is noted that a generally straightly inclined slope forming third emission face 6c shown in FIG. 4b is merely an example. Third emission face 6c may be formed of a curved slope unless the curved slope is configured as to disturb broad and uniform emission from light flux control member 5.

Now defined are some points, lines, quantities and others as below in connection with FIGS. 3, 4a and 4b. It is noted that "inner-propagation light" means light which propagates within light flux control member 5 after being emitted from emission element 4 and then entering into light flux control member 5.

Connection point Pa; connection point (boundary) between second emission face 6b and third emission face 6c.

δ1; angle of straight line running through emitting point 13 and connection point Pa with respect to optical axis L.

δ2; angle of straight line running through emitting point 13 and inflection point Po with respect to optical axis L.

Reference plane C; horizontal plane (in FIG. 3) which extends through emitting point 13 and vertically with respect to optical axis L.

Point Px; position at which inner-propagation light is emitted from light control emission face 6 (i.e. a crossing point at which light H meets light control emission face 6 in the cross section plane shown in FIG. 3.

Straight line A; straight line running through point Px and in parallel with reference plane C.

Tangential line B; tangential line of profile line of light control emission face 6 at position Px.

θ; angle of travelling direction of light emitted from emission element 4 with respect to optical axis L.

θ1; angle of travelling direction of light at a reaching point on emission face (light control emission face 6) after being emitted from emission element 4 and then travelling within light flux control member 5 with respect to a straight line which runs through the reaching point and in parallel with optical axis (reference optical axis) L.

θ3 angle of tangential line B with respect to straight line A.

θ5 Emission angle of inner-propagation light on being emitted from emission face (light control emission face 6)=angle of travelling direction of light (H) emitted from the emission face (light control emission face 6) of light flux control member 5 with respect to optical axis (reference optical axis) L.

In addition, "maximum intensity direction", "maximum intensity primary light", "maximum intensity", "half-intensity primary light" and "half-intensity angle" are defined as follows in connection with angular characteristics of light intensity.

maximum intensity direction; direction to which light is emitted from emission element 4 most strongly.

maximum intensity primary light; light which is emitted from emission element 4 to maximum intensity direction.

maximum intensity; intensity of maximum intensity primary light half-intensity primary light; light which is emitted from emission element 4 at half maximum intensity.

half-intensity angle; angle of travelling direction of inner-propagation light corresponding to half-intensity primary light with respect to travelling direction of inner-propagation light corresponding to maximum intensity primary light.

It is noted that the present invention is described under provision such that maximum intensity direction substantially accords with direction of optical axis L (normal direction of reference plane C). Usually, such provision is practical and maximum intensity direction can be regarded as the same direction as the direction of optical axis L. In addition, it is provided that emission direction intensity profile (angular characteristics) of emission element 4 is substantially symmetric with respect to optical axis L and a unique half-intensity angle (absolute value) exists.

Under the above definitions, configuration of curved surface of light control emission face 6 shown in FIG. 3 meets the following conditions. In other words, configuration of curved surface of light control emission face 6 is formed as to satisfy the conditions.

Conditions; at least in a predetermined range of θ1, 0<Δ≦θ1 (absolute value)<a predetermined angle larger than half-intensity angle,
(a) θ5/θ1>1
(b) θ5 increases with increasing of θ1, and
(c) increasing quality of θ5 (>0) relative to increasing quality of θ1 (>0) gets smaller acceding to increasing of θ1.

It is noted that Δ is a small angle expressing being near angularly to a direction of optical axis L. A preferable value of Δ is 5 degrees that defines an angle range of θ1 within ±5 degrees.

Figure 8:
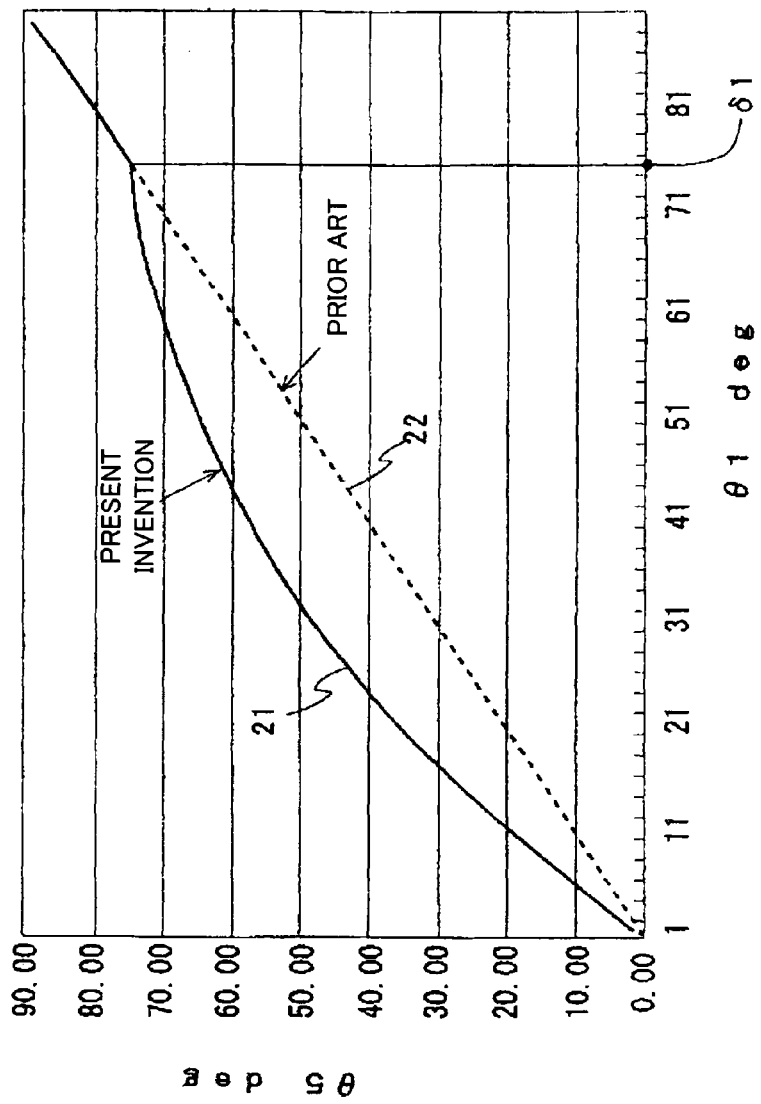
FIG. 8 gives a graphic illustration showing a relation between emission angle θ1 of light emitting element and emission angle θ5 of light flux control member.

FIG. 8 gives a graphic illustration showing a relation between angle θ1 and angle θ5 (3 emission angle from light flux control member 5). Referring to FIG. 8, curve 21 gives an example meeting the above conditions. According to this example, the above-mentioned "predetermined angle larger than half-intensity angle" is δ1. A value of δ1 is 75 degrees (δ1=75°).

On the other hand, dotted line 22 shown in FIG. 8 expresses (θ5/θ1)=1.

Now α is defined as coefficient expressing degree of light diffusion performed by light flux control member 5. Angles θ5 and θ3 are given by the following formula (1) and formula (2), respectively, under condition of θ1 <δ1.

$$\theta5=[1+\{(\delta1-\theta1)\times\alpha/\delta1\}]\times\theta1 \text{ (where θ1 (absolute value)<δ1)} \quad (1)$$

$$\theta3=\tan^{-1}[(\sin\theta5 - n\cdot\sin\theta1)/(\cos\theta5 - n\cdot\cos\theta1)]$$
(where n=refractive index of light flux control member) (2)

It is noted that optical axis L shown in FIG. 3 accords with the normal direction with respect to reference plane C. It is further noted that some light in the vicinity (e.g. a range about −5°<θ1< about +5°) of the above normal line (optical axis L in FIG. 13) satisfies θ1=θ5. This prevents an area-to-be-illuminated from having a locally dark portion just above light emitting element 4.

Figure 9:
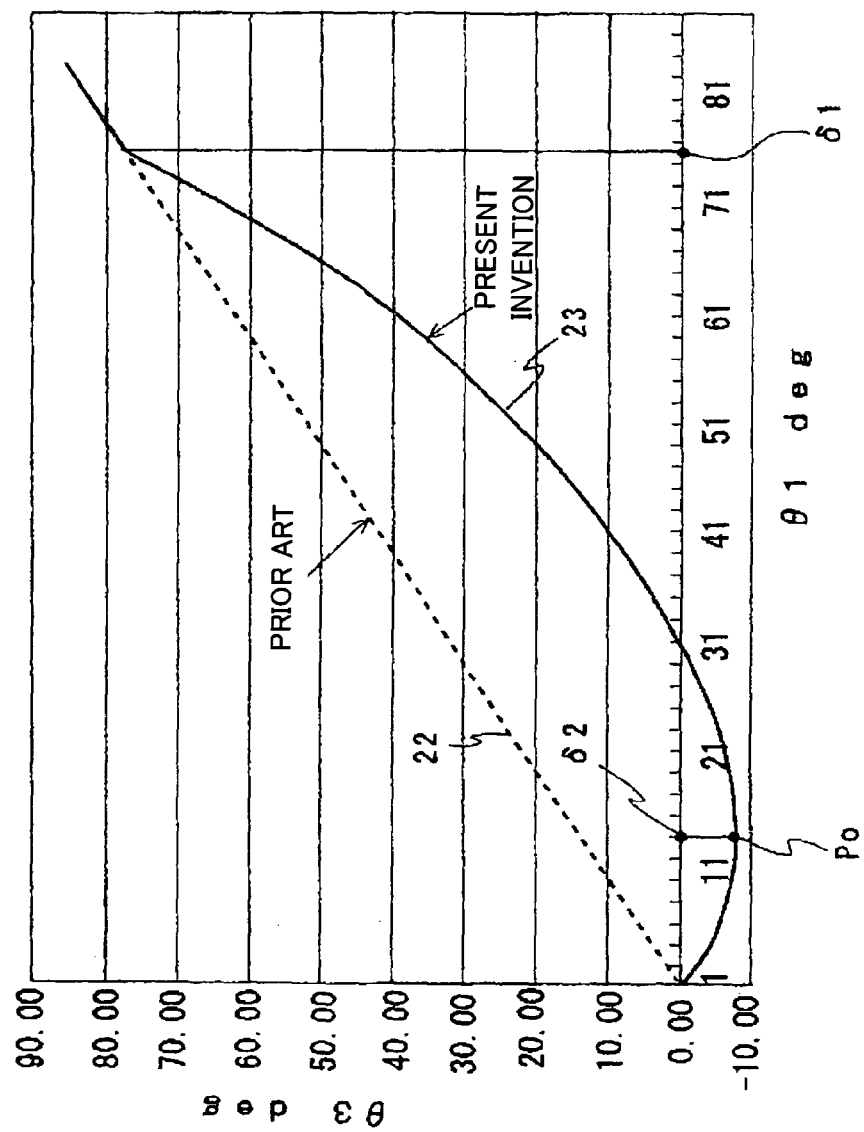
FIG. 9 gives a graphic illustration showing a relation between emission angle θ1 of light emitting element and lens surface inclination angle of light flux control member θ3.

Substituting above formula (1) for above formula (2), θ3 is expressed as to be regarded as a function of θ1. FIG. 9 gives a graph showing an example of this function. Referring to FIG. 9, curve 23 expresses a relation between θ3 and θ1 determined on the basis of above formulae (1) and (2). Curve 23 teaches the followings.

(i) Angle θ3 gets smaller gradually with increasing of θ1 so far as θ1 ranges from a neighbour of optical axis L to δ2 (until θ1=δ2).
(ii) Angle θ3 gets greater gradually with increasing of θ1 so far as θ1>δ2.
(iii) When angle θ1 accords with δ1, θ3=θ1 is satisfied.

Figure 13:
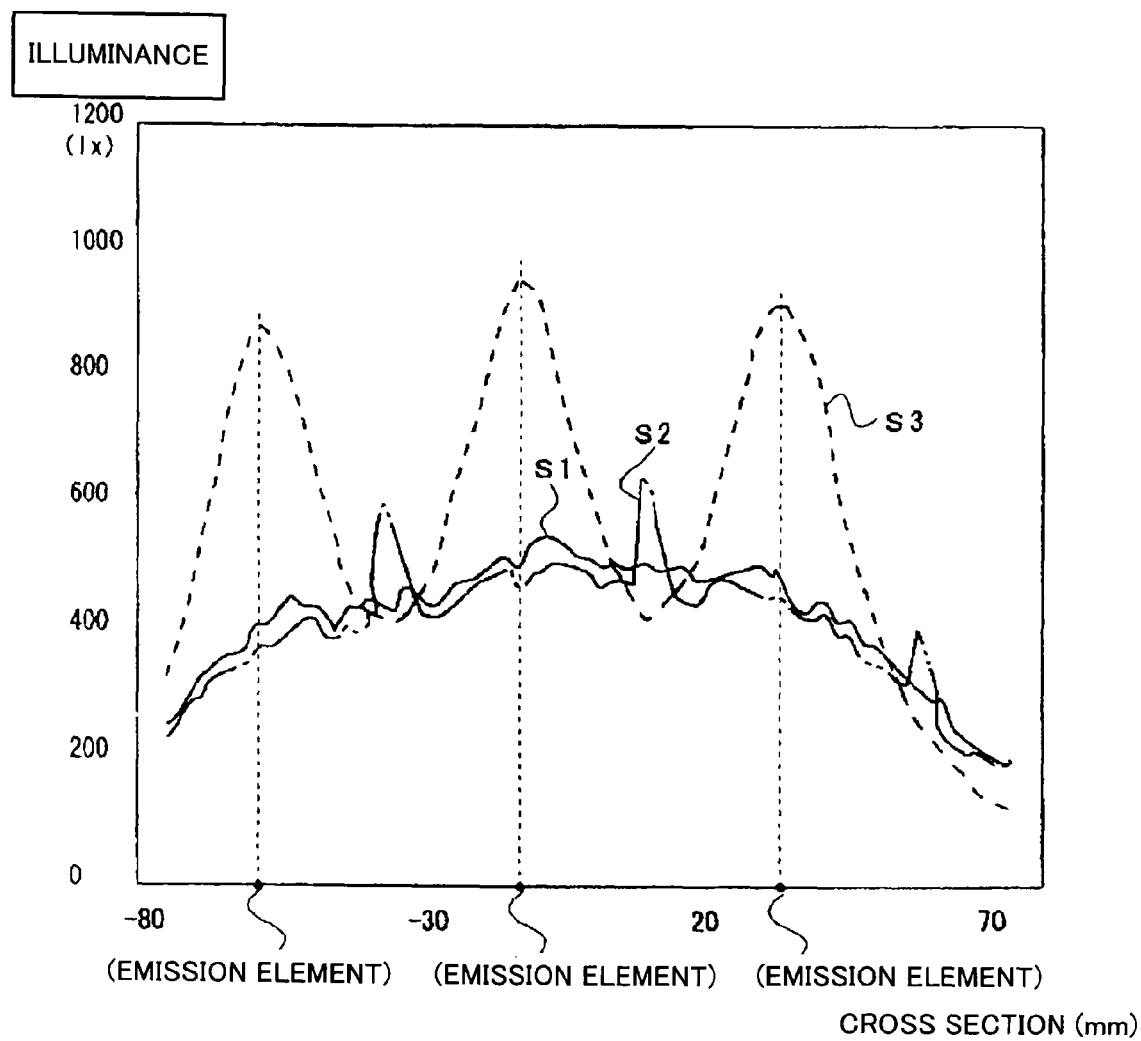
FIG. 13 is a graphic diagram illustrating an emission quantity distribution of light supplied to an object-to-be-illuminated of a display employing an emission device in accordance with the present invention together with an reference example for comparison.

A region on a surface-to-be-illuminated illuminated by light fluxes in the vicinity of optical axis L of light emitting element (emission element) 4 is apt to be brighter as compared with the other region (See S3 in FIG. 13). Therefore light flux control members 5 are required to meet some conditions for realizing uniform illumination of a surface-to-be-illuminated under employment of a matrix-like arrangement of light emitting elements 4 as illustrated in FIG. 1.

That is, since each of light emitting elements 4 disposed in correspondence to respective light flux control members 5 tends to output particularly strong light fluxes (main fluxes) toward directions in a certain range of solid angle around optical axis L, light flux control members 5 are required to have a function of expanding traveling directions of the fluxes included in the maim fluxes. This function enables a large area of surface-to-be-illuminated to be illuminated uniformly. FIG. 3 shows an example of light control emission face 6 configured for performing the function.

(3) Details of Circle-Like Plan-Shape In-Groove-Recess (es) of Light Flux Control Member As shown in FIGS. 4*a* to 4*c*, second recess portion (in-groove-recesses) 15 formed on back face 12 of light flux control member 5 is composed of first in-groove-recess 15*a* and second to forth in-groove-recesses 15*b* to 15*d* which are successively formed radially outward as to surround first in-groove-recess-portion 15 and have circle-like plan-shapes. First in-groove-recess 15*a* has a circle-like plan-shape and is formed as to be adjacent to recess portion 14.

FIG. 4*c* gives an partially enlarged cross section view of ventilation groove 19B. It is noted that cross section profile of ventilation groove 19B and cross section profile of ventilation groove 19A are mutually s symmetric with respect to optical axis L as a center. Therefore description on configuration (cross section profile) is carried out only as to ventilation groove 19B, description on configuration of ventilation groove 19A being omitted.

As shown in FIG. 4*c*, first in-groove-recess 15*a* has a triangle-like cross section along a plane (an imaginary plane) which includes optical axis and is perpendicular to groove bottoms 191 of ventilation grooves 19A, 19B. First slope 15*a*1 is generally located on an extended part of straight line 25 running from emitting point 13 to opening edge 24 of recess portion 14, looking like a circle as viewed from the side of back face 12 of light flux control member 5. In other words, first slope 15*a*1 provides an arc-like plan-shape. In the triangle-like cross section shape, first slope 15*a*1 provides an end portion at opening edge 14 and another end portion, end portion 15*a*3, which is located at depth of w from groove bottom 191. Groove bottom 191 is bridged by first slope 15*a*1 to end portion 15*a*3.

Second slope 15*a*2 is formed as to be generally perpendicular to first slope 15*a*1, looking like a circle as viewed from the side of back face 12 of light flux control member 5. In other words, second slope 15*a*2 provides an arc-like plan-shape. First in-groove-recess-portion 15*a* is composed of first and second slopes 15*a*1 and 15*a*2.

It can be said that above sentence "First slope 15*a*1 is generally located on an extended part of straight line 25 running from emitting point 13 to opening edge 24 of recess portion 14" means, in FIG. 4*c*, either (I) or (II) below.

(I) First slope 15*a*1 is located on an extended part of straight line 25 on the cross section of light flux control member 5 shown in FIG. 4*c*.
(II) First slope 15*a*1 is located on a straight line segment which is obtained by rotating the extended part of straight line 25 anticlockwise slightly around a rotation point provided by opening edge 24 in a plane corresponding to the cross section, shown in FIG. 4*c*, of light flux control member 5. Please see a location denoted by a dotted line in FIG. 4*c* showing an example of location meeting this condition.

First slope 15*a*1 is preferably inclined as to hardly receive light which is directly directed to groove bottom 191 after being emitted from emission element 4. Above sentence "Second slope 15*a*2 is generally vertical to first slope 15*a*1" is related to the illustration of FIG. 4*c*, meaning either (III) or (IV) below.

(III) Second slope 15*a*2 crosses first slope 15*a*1 at an angle slightly smaller than 90°.
(IV) Second slope 15*a*2 crosses first slope 15*a*1 at an angle slightly larger than 90°.

It is noted that such deviations from the right angle are allowed under taking account of manufacturing errors. An example of upper limit of such deviations is 5 degrees.

Second slope 15a2 is preferably inclined so that light incident thereto from light emitting element 4 is prevented from being refracted on being incident thereto toward a direction which comes nearer to reference optical axis L.

As shown in FIG. 4c, second in-groove-recess portion 15b has a triangle-like cross section different from said triangle-like cross section of first in-groove-recess portion 15a, consisting of first slope 15b1 and second slope 15b2.

First slope 15b1 is generally located on an extended part of straight line 27 running from emitting point 13 to end edge 26, located on the side of groove bottom, of second slope 15a2 of first in-groove-recess-portion 15a. Second slope 15b2 has a circle-like plan-shape, providing a bridge connecting end portion 15b3 of first slope 15b1 to groove bottom 191. End portion 15b3 is located at depth of w from groove bottom 191, being an end portion other than end edge 26 on the side of groove bottom. Second slope 15b2 is formed as to be generally perpendicular to first slope 15b1, providing a circle-like plan-shape.

Third in-groove-recess portion 15c has a triangle-like cross section different from said triangle-like cross sections of first and second in-groove-recess portions 15a, 15b, consisting of first slope 15c 1 and second slope 15c2, as illustrated in FIG. 4c.

First slope 15c1 is generally located on an extended part of straight line 30 running from emitting point 13 to end edge 28, located on the side of groove bottom, of second slope 15b2. Second slope 15c2 has a circle-like plan-shape, providing a bridge connecting end portion 15c3 of first slope 15c1 to groove bottom 191. End portion 15c3 is located at depth of w from groove bottom 191, being an end portion other than end edge 28 on the side of groove bottom. Second slope 15c2 is formed as to be generally perpendicular to first slope 15c1, providing a circle-like plan-shape.

Forth in-groove-recess portion 15d has a triangle-like cross section different from said triangle-like cross sections of first to third in-groove-recess portions 15a to 15c, consisting of first slope 15d1 and second slope 15d2, as illustrated in FIG. 4c.

First slope 15d1 is generally located on an extended part of straight line 32 running from emitting point 13 to end edge 31, located on the side of groove bottom, of second slope 15c2. Second slope 15d2 has a circle-like plan-shape, providing a bridge connecting end portion 15d3 of first slope 15d1 to groove bottom 191. End portion 15d3 is located at depth of w from groove bottom 191, being an end portion other than end edge 31 on the side of groove bottom. Second slope 15d2 is formed as to be generally perpendicular to first slope 15d1, providing a circle-like plan-shape.

It is noted that depth w of first to forth in-groove-recess portions 15a to 15d and distance L2 from optical axis L to the outermost edge of in-groove-recess-portion 15d (back face side end edge 33 of second slope 15d2) are preferably determined under consideration of factors such as size of light flux control member 5, emission brightness of emission element 4, depth (distance) $\epsilon$ from emitting surface 20 of emission element 4 to groove bottoms 191 of ventilation grooves 19A, 19B of light flux control member 5 and half-intensity angle of emission element 4.

In addition, in-groove-recess portions 15 of ventilation grooves 19A, 19B of light flux control member 5 as second recess portion in the embodiment work effectively under situation such that emission element 4 emits light including rays which are largely inclined light with respect to optical axis L.

Thus depth $\epsilon$ of ventilation grooves 19A, 19B is preferably small so that a great part of the light emitted from emission element 4 is incident to first recess portion 14 and the other part of the light emitted from emission element 4 is incident to in-groove-recess-portions (second recess portion) 15. For example, depth $\epsilon$ is preferably formed as to be smaller than radius of opening edge 24 of first recess portion 14.

(4) Operation of Light Flux Control Member (Incidence and Emission of Light of Emission Element)

Now described is operation of light flux control member 5 on the basis of FIGS. 2 to 4c. In the first place, most of light within half-intensity angle (light of θ1 smaller than half-intensity angle) enters into light flux control member 5 through first recess portion 14 as shown in FIG. 2. Incidence to first recess portion 14 involves substantially no refraction in the embodiment. The other is incident to second in-groove-recess portions 15a to 15d, entering into light flux control member 5.

Substantially none of such light H entering into via second in-groove-recess portions 15a to 15d undergoes incidence to any of first slopes 15a1, 15b1, 15c1 and 15d1. In other words, substantially all of such light H undergoes incidence to any of second slopes 15a2, 15b2, 15c2 and 15d2.

Incidence to second slopes 15a2, 15b2, 15c2 and 15d2 hardly involves refraction because they provide surfaces generally vertical to travelling direction of light H emitted from emission element 4. As a result, generation of rays deflected as to come near to optical axis L.

Figure 20:
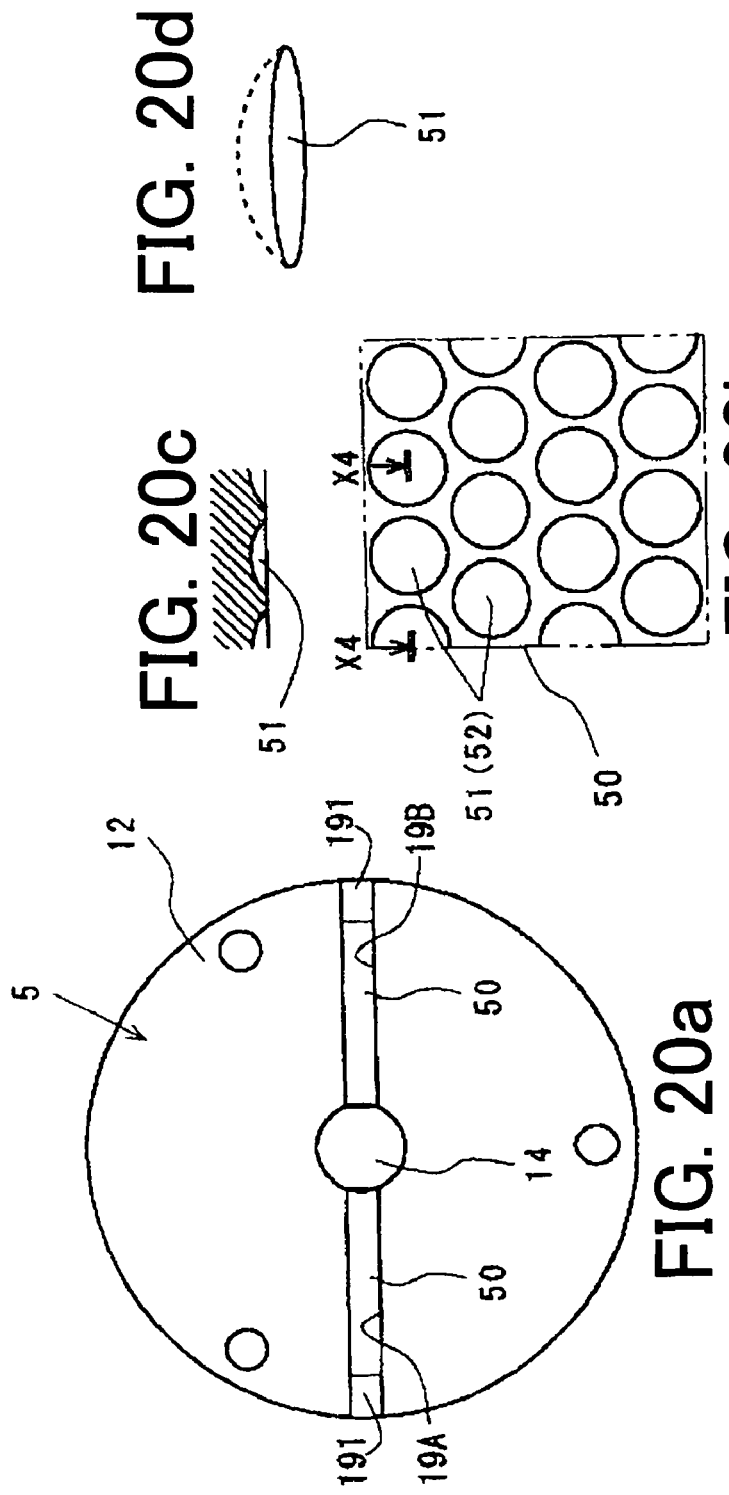
FIGS. 20a through 20f illustrate light flux control members employed in other modifications in accordance with the present invention, FIG. 20a illustrating a back face of the same light flux control member, FIG. 20b being a partially enlarged illustration of a part of back face of the light flux control member, FIG. 20c being a cross section view of a first example of second recess portion (a cross section view of a hemisphere-like recess portion along x4-x4 in FIG. 20b), FIG. 20d being a perspective view of the second recess portion shown in FIG. 20c, FIG. 20e being a cross section view of a second example of second recess portion (a cross section view of a conical-like recess portion along x4-x4 in FIG. 20b) and FIG. 20f being a perspective view of the second recess portion shown in FIG. 20e.

Next, referring to FIGS. 2 and 3, light H from emission element 4 is emitted from light control emission face 6 to the outside (air) according to Snell's Law after inner-propagation. Light emitted from light control emission face 6 is directed to smoothly expanded broad angles uniformly without locally strong emitting directions such as direction corresponding to optical axis L. Such performance is superior to that of prior art shown in FIG. 20 in which hemisphere-like light flux control member 123 is employed.

Figure 10:
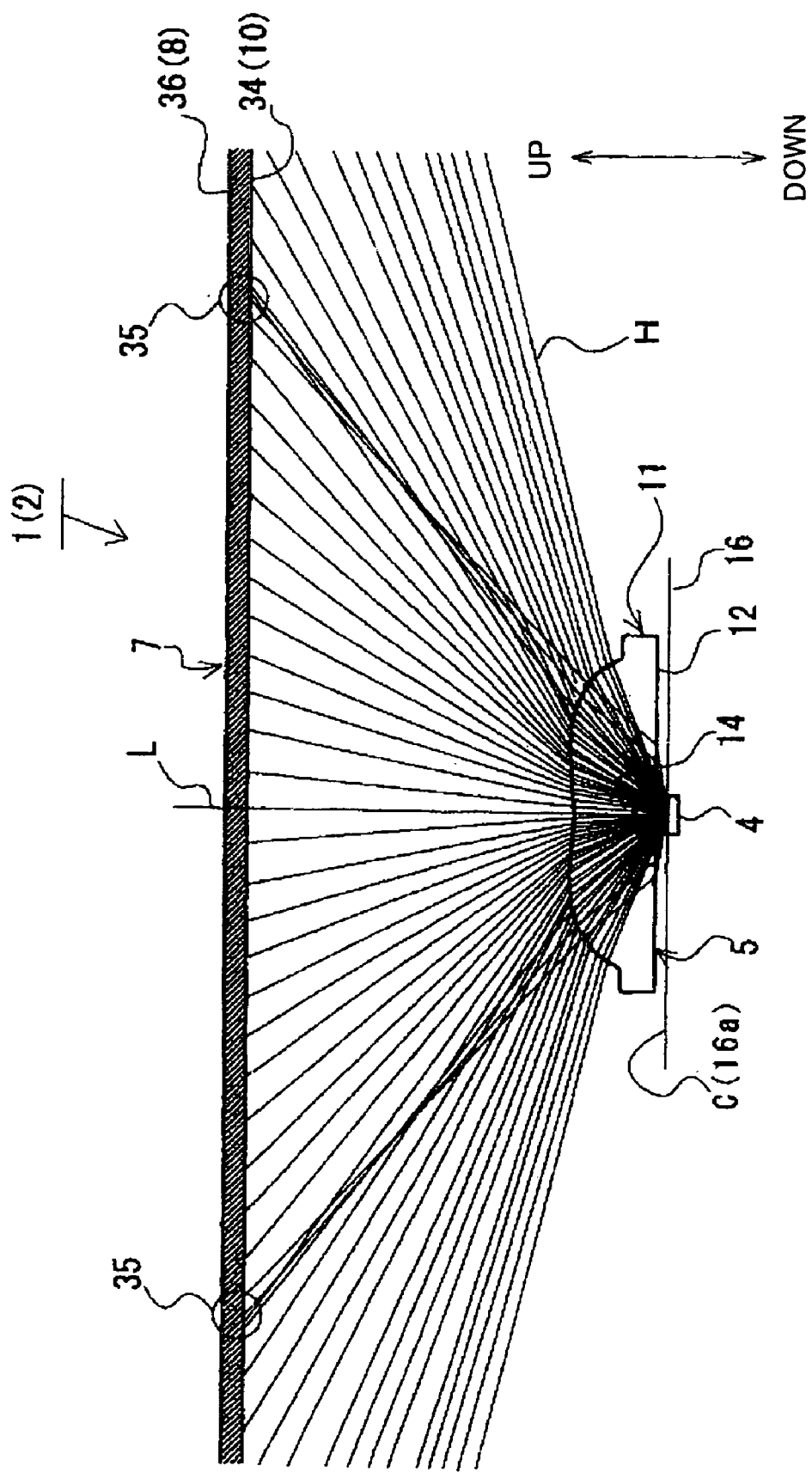
FIG. 10 gives a diagramic illustration showing a trouble generation state which would be brought under a condition such that light is incident to the whole area of back face of light flux control member.

It is noted that, if back face 12 of light flux control member 5 is parallel to reference plane C (namely, if none of in-groove-recess-portions 15 is formed in ventilation grooves 19A, 19B shown in FIGS. 4a to 4c) as illustrated in FIG. 110, light H from emission element is refracted as to come near to optical axis L. This would brings a result such that light H undergoing incidence to first recess portion 14 and other light H undergoing incidence to the other part (other than first recess portion 14) of back face 12 gather on surface-to-be-illuminated 34 of light diffusion member 7 after being emitted from light flux control member 5. Such phenomenon occurs, in other words, when light flux control member 5 shown in FIG. 10 is employed.

Such light gathering part 35 provide a ring-like locally bright part brighter than the other part. Such ring-like bright part is seen from above emission face 36 of light diffusion member 7, resulting in a reduced illumination quality. Light flux control member 5 of the embodiment in accordance with the present invention can avoid such a ring-like locally bright portion from appearing because second recess portion 15 function as to restrains refraction on entering into light flux control member 5 from producing rays which bring ring-like locally bright part.

According to the embodiment in accordance with the present invention, back face 12 of light flux control member 5 has ventilation grooves 19A, 19B provided with in-groove-recess-portions 15, with the result that light H from light emitting element 4 is restrained from producing rays coming near to optical axis L by being refracted on incidence to in-groove-recess-portions 15. This enables light emitted from light control emission face 6 is directed to smoothly expanded broad angles uniformly as to cover a range to be illuminated (See FIG. 2).

Repeatedly saying, according to the present invention, light flux control member 5 is disposed so that back face 12 of light flux control member 5 is closely in contact with substrate 16 and back face 12 has ventilation grooves 19A, 19B having groove bottoms 191 provided with in-groove-recess-portions 15. Therefore light reaching groove bottom 191 from light emitting element 4 is restrained from undergoing refraction such that rays coming near to optical axis L are produced. As a result, smooth expansion of travelling directions of light H is realized as to cover a necessary illumination range.

Besides, as described previously, ventilation grooves 19A, 19B enables recess portion 14 of light flux control member 5 to be ventilated, and accordingly, light flux control member 5 is prevented from having a harmful temperature increase.

(Light Diffusion Member)

Referring to FIGS. 2 and 3, light diffusion member 7 is a sheet-like or flat plate-like optical element capable of transmitting and diffusing light. Base material of light flux control member 7 is, for example, light permeable resin such as PMMA (polymethyl methacrylate) or PC '(polycarbonate). Light diffusion member 7 has a plan size generally the same as that of object-to-be-illuminated such as LCD-panel, advertising panel or other display panels. Light diffusion member 7 is provided with light diffusion ability given to at least inside or surface. For example, light diffusion member 7 has a surface provided with micro-unevenness such as prismatic projections, emboss-processed surface, bead-coating surface. Micro-particles may be dispersed in light diffusion member 7 so that inside scattering ability is given.

Light diffusion member 7 may be mounted on an inner side of object-to-be-illuminated 3 or, alternatively, may be disposed as to separated from object-to-be-illuminated 3 between object-to-be-illuminated 3 and light flux control member 5.

(Concrete Example of Emission Device and Surface Light Source Device)

Now described is an concrete example of emission device 11 using light flux control member 5 and surface light source device 2 including emission device 11 by referring to FIGS. 1 to 4c.

For light control emission face 6 of light flux control member 5 shown in FIGS. 1 to 4c, size, configuration and others of first and second emission faces 6a, 6b may be determined under consideration of various factors as follows.

Emission characteristics of emission element; In particular, expansion angle of light emitted from emission element 4. This can be expressed, for example, by half-intensity angle defined previously.

Thickness of light flux control member 5 along optical axis L; In particular, distance d from emitting point 13 (emitting surface 20) of emission element 4 to the top location of light control emission face 6 along optical axis L.

Arrangement pitch (interval) p of emission elements 4

Outer diameter Do of light flux control, member 5

Distance L1 from light control emission face 6 to light diffusion member m 7 along optical axis L.

Refractive index n of light flux control member 5

Configuration of recess portion 14 of light flux control member 5

An example of data set of light flux control member 5 is as follows.

Refractive index n=1.49 (transparent resin material)

Configuration of recess portion 14 is like a hemisphere, with r1–1.5 mm, L1=15.41 mm, p=46 mm, d=4.59 mm and Do=16.5 mm.

Under such data, light flux control member 5 is formed as to give $\theta1=\delta2=14°$ at the connection portion between first emission face 6a and second emission face 6b, and as to give $\theta1=\delta1=75°$ at the connection portion between second emission face 6b and third emission face 6c.

Third emission face 6c is formed as to have a configuration that is obtained by rotating tangential line at the outermost of second emission face 6b around optical axis L by 360 degrees. In FIG. 4b, a range of $\theta1\leq\delta2$ gives (corresponds to) a range of first emission face 6a. On the other hand, a range of $\delta2\leq\theta1\leq\delta1$ gives (corresponds to) a range of second emission face 6b. Further, a range of $\delta1\leq\theta1$ gives (corresponds to) a range of third emission face 6c.

As shown in FIGS. 4a to 6, ventilation grooves 19A, 19B of depth $\epsilon=0.5$ mm and width $S=1.0$ mm are formed on back face 12 of light flux control member 5. Ventilation grooves 19A, 19B has groove bottoms 191 provided with in-groove-recess-portions 15. In-groove-recess-portions 15 consist of first to forth in-groove-recess-portions 15a to 15d, being expressed by the following data.

Depth from groove bottoms 191 w=0.2 mm

Distance L2 from optical axis L to the radially outer end of forth in-groove-recess-portion 15d=5.79 mm Angle of straight line 25 (first slope 15a1) of first in-groove-recess portion 15a with respect to reference plane C=19.5°

Angle of straight line 27 (first slope 15b1) of second in-groove-recess portion 15b with respect to reference plane C=13.7°

Angle of straight line 30 (first slope 15c1) of third in-groove-recess portion 15b with respect to reference plane C=9.7°

Angle of straight line 32 (first slope 15d1) of forth in-groove-recess portion 15d with respect to reference plane C=6.9°

In addition, first to forth in-groove-recess portions 15a to 15d are have second slopes 15a2 to 15d2 which are vertical to first slopes 15a1 to 15d1, respectively.

The reason why in-groove-recesses terminate at forth in-groove-recess portion 15d is based on results obtained by simulation described below. The simulation (experiment) was performed for studying a preferable range in which in-groove-recess portions are formed to prevent ring-like locally bright part from appearing due to incidence to back face 12 of light flux control member 5.

First prepared was a surface light source device including an emission device which are the same as surface light source device 2 and emission device 1 in accordance with embodiment except that no in-groove-recess portion 15 is formed at groove bottoms 191 of ventilation grooves 19A, 19B on back face 12. For the sake of description, thus prepared light flux control member 5 having no in-groove-recess portion 15 on the back face thereof is called "dummy light flux control member 5".

Groove bottoms 191 of ventilation grooves 19A, 19B of dummy light flux control member 5 was covered partially by ring-like light shielding (shading) plate member 37.

Several kinds of light shielding (shading) plate members 37 were prepared. They had different areas of openings 38 from each other. Different areas of openings 38 correspond to different ranges of incident angle θ to light flux control member 5). These light shielding plate members 37 are applied one by one in turn to groove bottoms 191 of ventilation grooves 19A, 19B of dummy light flux control member 5. For each application of light shielding plate member 37, illuminance of ring-like locally bright part on surface-to-be-illuminated 34 of light diffusion member 7 was calculated (estimation based on calculation). Results are shown in FIG. 12.

Figure 11:
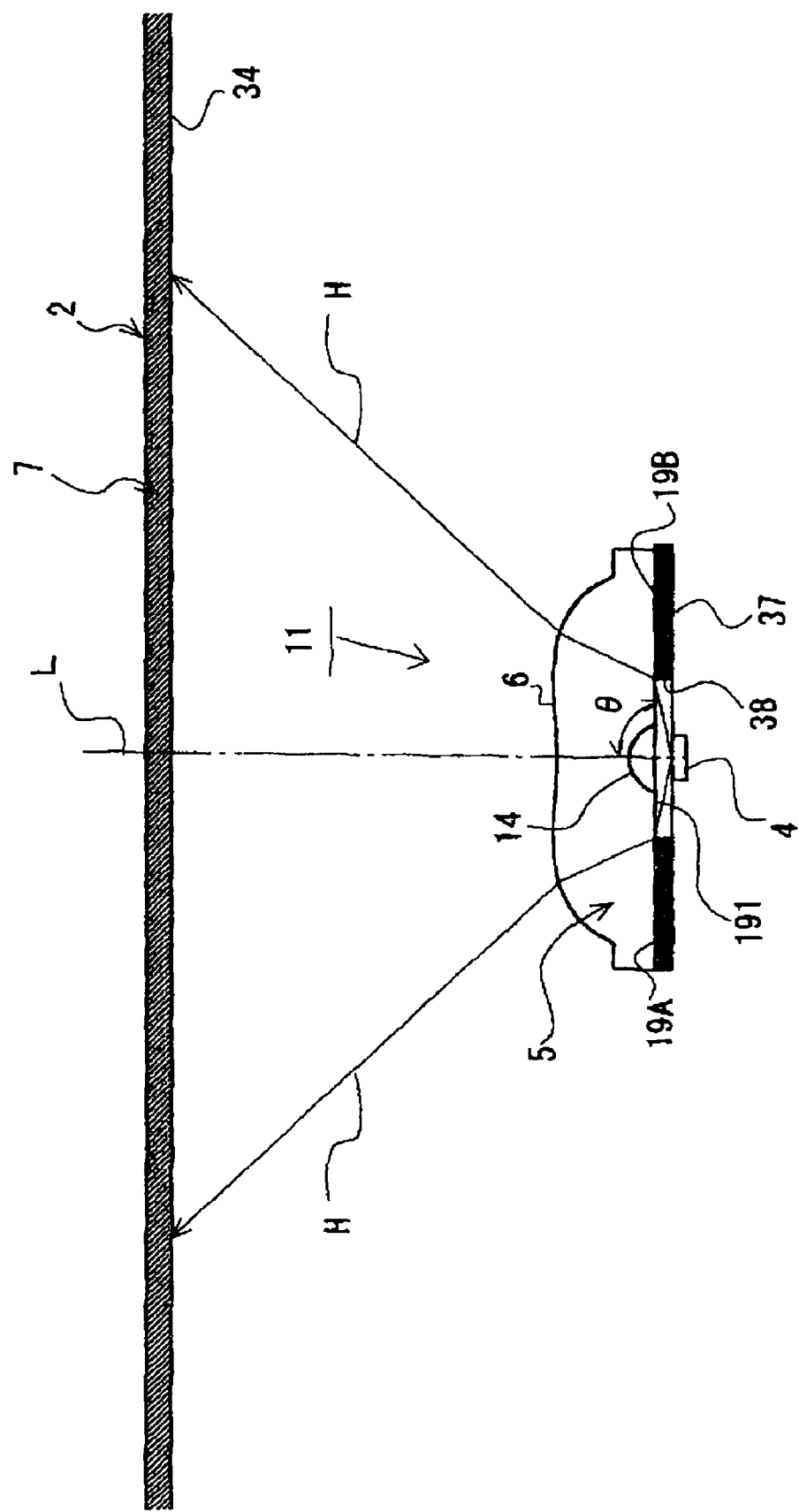
FIG. 11 is a diagram illustrating illuminance measurement simulation of bright part.
Figure 12:
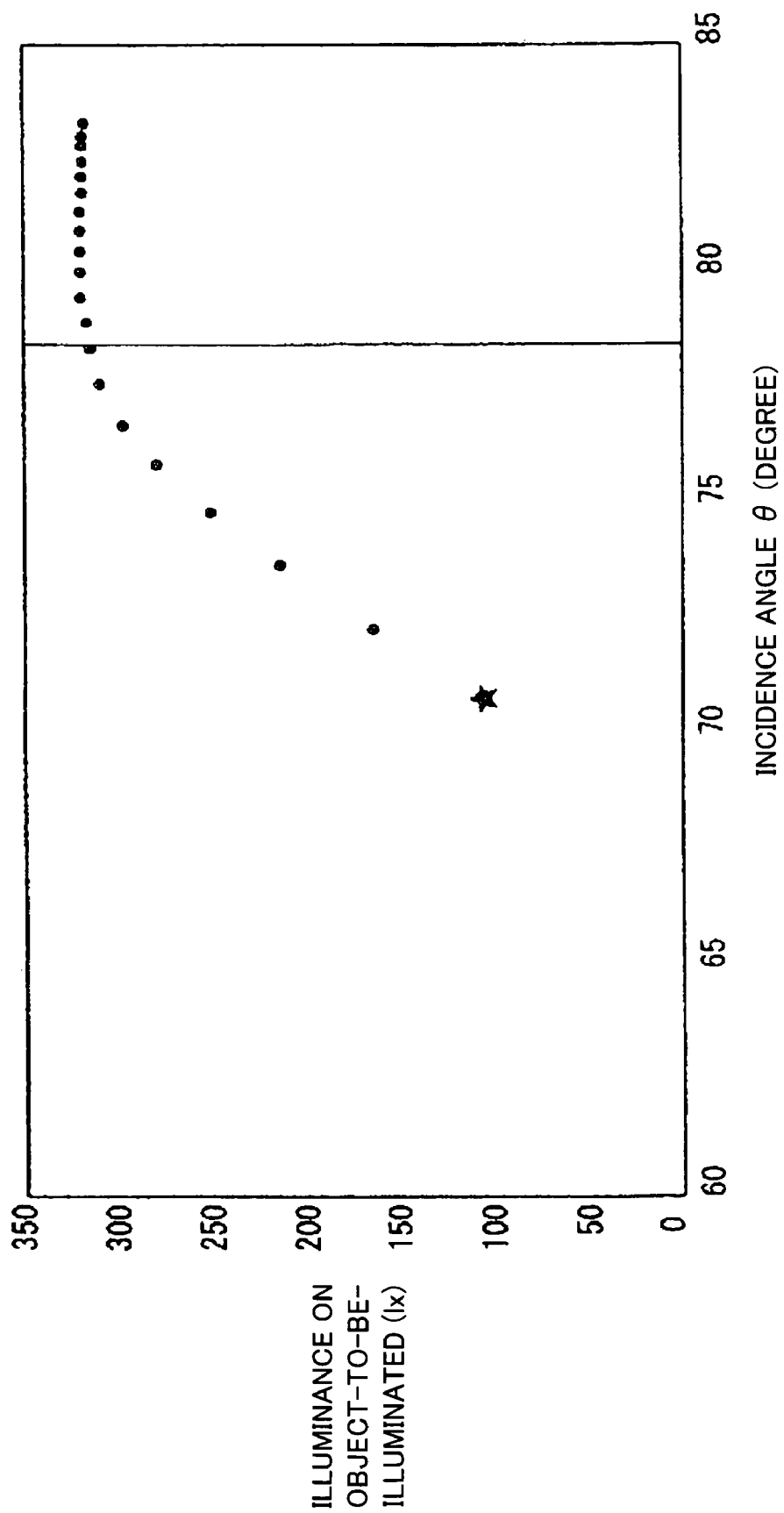
FIG. 12 is a graphic diagram illustrating a result of the simulation shown in FIG. 11, wherein abscissas gives distance from reference optical axis and ordinate gives illuminance of bright part.

As shown in FIG. 12, the larger area of opening 38 is the larger is illuminance of ring-like locally bright part until incidence angle θ1 in FIG. 11 reaches about 78 degrees. However, if incidence angle θ1 exceeds about 78 degrees, illuminance converges to a generally constant value gradually.

This tells that light incident to back face 12 with incidence angle θ larger than 78 degrees hardly influences ring-like locally bright part. Therefore covering range of in-groove-recess portions 15 can be regarded as being enough so far as light with θ smaller than 78 degrees is taken into consideration.

It is noted that light is refracted as to come nearer to optical axis L under employment of dummy light flux control member 5 as shown in FIG. 10, and accordingly, ring-like locally bright part 35 appears as to surround optical axis L on surface-to-be-illuminated 34 of light diffusion member 7. Such ring-like locally bright part 35 reduces illumination quality.

To the contrary, as previously described, light flux control member 5 in accordance with the embodiment (concrete example) prevents light incident to a part other than recess portion 14 from being refracted as to come nearer to optical axis L. In other words, such light incident to a part other than recess portion 14 enters into light flux control member 5 roughly without refraction (roughly without deflection). As a result, any ring-like locally bright part hardly appear on surface-to-be-illuminated 34 of light diffusion member 7, being free from reduction in illumination quality.

(Emission Quantity from Light Diffusion Member)

FIG. 13 is a graphic diagram illustrating an emission quantity distribution (emission intensity distribution) of light supplied to object-to-be-illuminated 3 of display 1. Shown in FIG. 13 is an emission quantity distribution of emission at locations along line X3-X3 in FIG. 1 on emission face 8 of light diffusion member 7 (See FIG. 2). In FIG. 13, ordinate gives illuminance (lx) and abscissa gives distance from a center of surface light source device 2 shown in FIG. 2 along line X3-X3.

Figure 31:
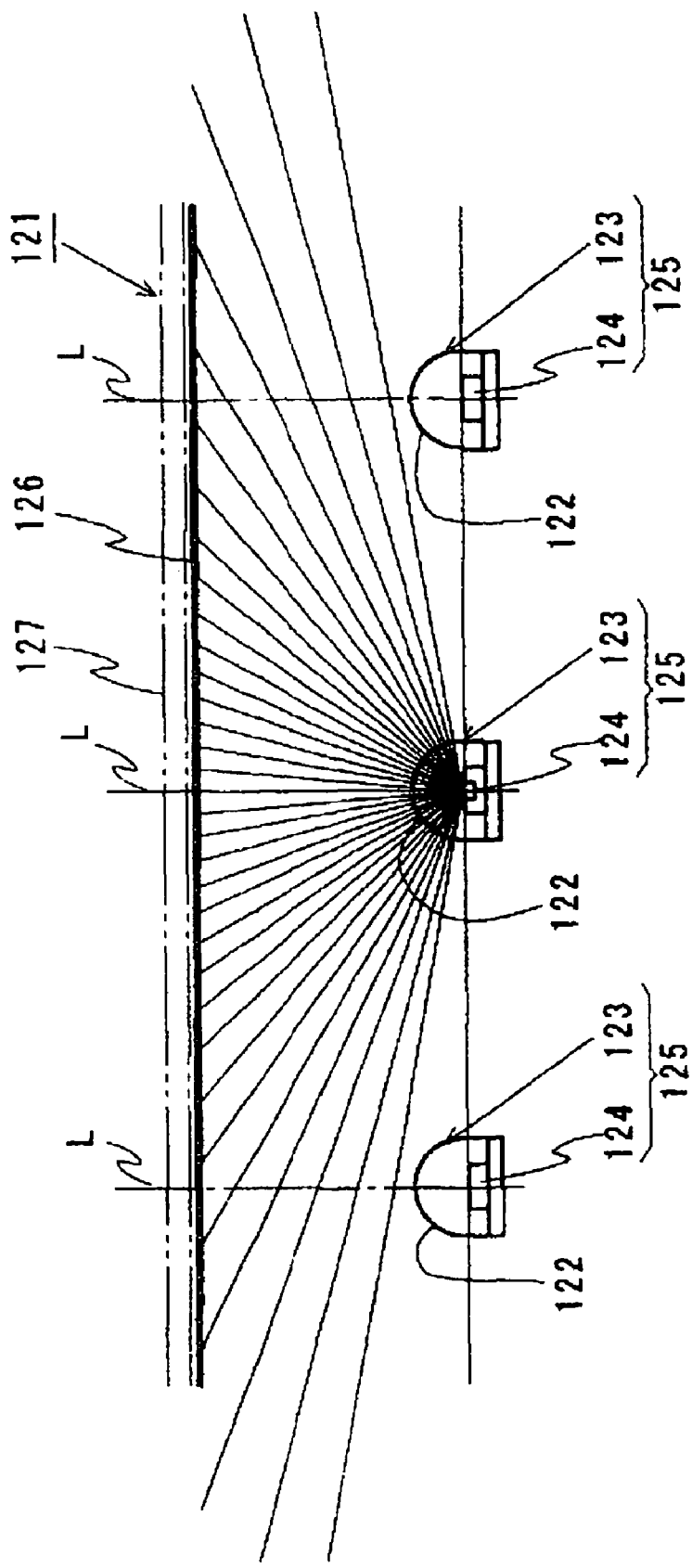
FIG. 31 is a cross section view of a display in accordance with a forth prior art.
Figure 32:
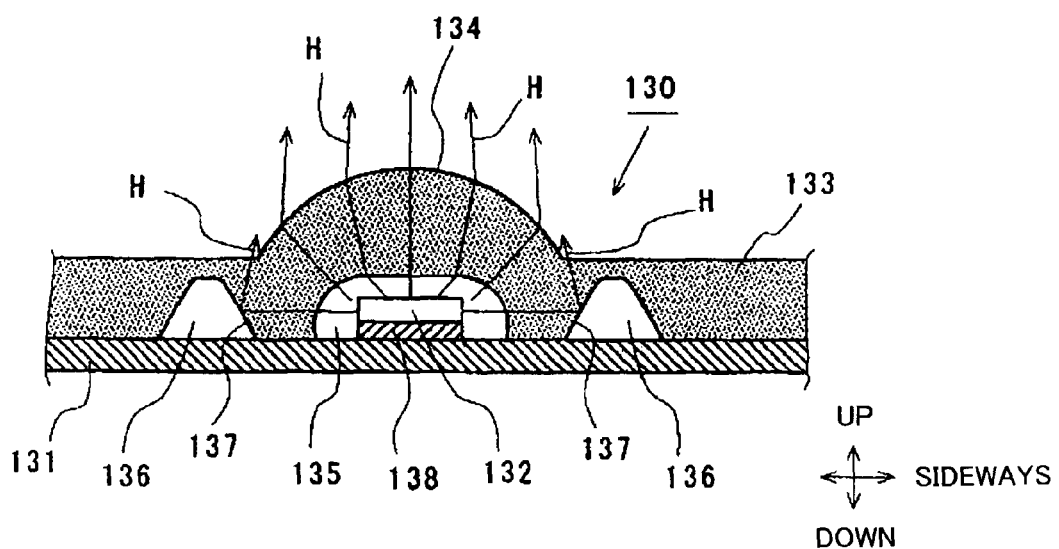
FIG. 32 is a cross section view of a matrix-type display in accordance with a fifth prior art.

Referring to FIG. 13, line S1 gives an illuminance distribution of surface light source device 2 employing emission device 1 in accordance with the embodiment. On the other hand, line S2 gives an illuminance distribution of surface light source device 2 employing emission device 11 shown in FIG. 10. In addition, line S3 gives an illuminance distribution of surface light source device 2 employing LED chip in accordance with the forth prior art as shown in FIG. 31.

As shown in FIG. 13, line S3 gives an extremely high illuminance just above emission element 4 and a much reduced illuminance at sections corresponding to absence of emission element 4. Illuminance varies largely, failing to provide uniform illumination. In other words, in cases of θ1=θ5, it is difficult to realize uniform illumination.

Line S2 gives an improved illuminance distribution, namely, entirely somewhat flattened illumination brightness, as compared with S2. However, in case of line S2, some rays (light H) are refracted as to come near to optical axis L on incidence to light flux control member 5, as understood from emission characteristics of emission device 11 shown in FIG. 10. These refracted rays cross over with other rays coming from recess portion 14. This brings ring-like locally bright part 35 at roughly a center of section corresponding to absence of emission element 4. Such ring-like locally bright part 35 is viewed through light diffusion member m 7, being harmful.

To the contrary, line S1 in FIG. 13 gives an illuminance distribution such that ring-like locally bright part 35 is prevented from appearing at sections corresponding to absence of emission element 4. This brings a very uniformly bright illumination.

SUMMARY OF EFFECTS OF THE EMBODIMENT

According to the embodiment, a greater part of the light emitted from emission element 4 enters into light flux control member 5, being emitted from light control emission face 6. Some of the light emitted from emission element 4 enters into light flux control member 5 via in-groove-recess portions 15a to 15d formed at groove bottoms 191 of ventilation grooves 19A, 19B. Such light H becomes inner-propagation light which is not deflected as to come nearer to optical axis L by refraction on incidence to in-groove-recess portions 15.

As a result, light H via in-groove-recess portions 15 is not emitted from light control emission face 6, or, if some emission involved, it occurs in the vicinity of the outermost periphery of light control emission face 6. This prevents ring-like, pint-like or line-like locally bright part from appearing, with the result that illumination light is kept high. Emission from light control emission face 6 is broadly and smoothly diverged, providing a uniform illumination.

It is to be noted that recess portion 14 and light emission control face 6 are configured so that light travelling direction expanding is effected more intensively for emission light fluxes having travelling directions near to direction of optical axis L as compared for emission light fluxes having travelling directions far from direction of optical axis L. In other words, Δθ5/Δθ is larger in region corresponding to light of small values of θ1 (emission angle from light emitting element 4) as compared with in region corresponding to light of large values of θ1.

If a plurality of emission elements 4 are arranged at intervals as primary light source, light fluxes from respective emission elements 4 are mixed mutually with ease. Accordingly, if unevenness in emission color exists among emission elements 4, light emitted from light flux control member 5 hardly shows unevenness in illumination color.

In addition, ventilation grooves 19A, 19B prevent light flux control member 5 from having a harmful temperature increase which would caused by heat generated by light emitting element 4 during being switched on. Thus light flux control member 5 is free from troubles such as deformation due to undesirable temperature rising.

(First Modification of Second Recess Portion)

Figure 14:
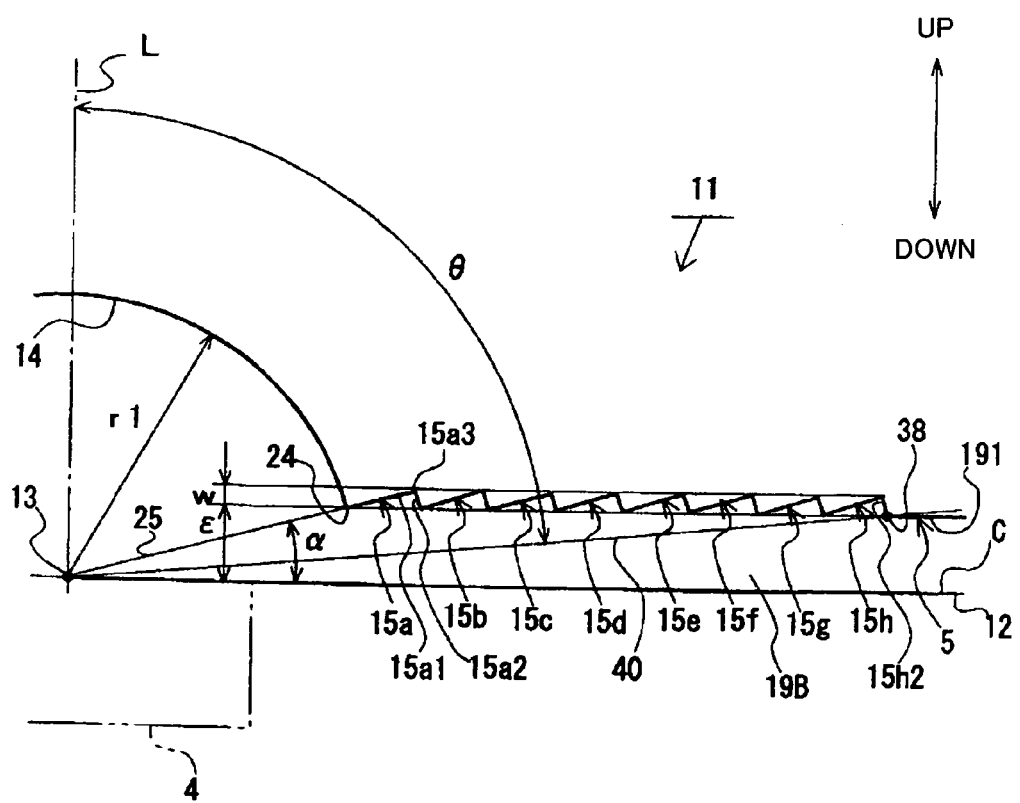
FIG. 14 illustrates a first modification of second recess portion, giving a partially enlarged cross section of a back side part of a light flux control member.
Figure 15:
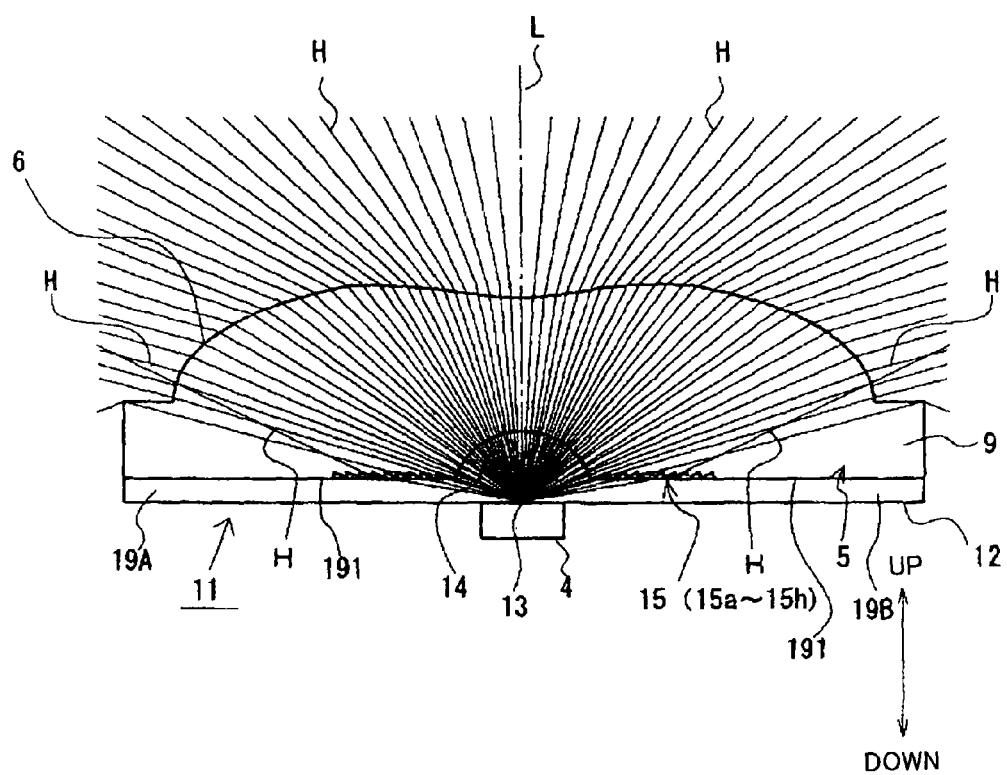
FIG. 15 is a diagram illustrating operation (state of causing light c from an light emitting element) of a light flux control member provided with the second recess portion of the first modification.

FIGS. 14 and 15 illustrate a first modification of in-groove-recess-portion (second recess portion) 15. It is noted that light flux control members 5 employed in the first modification and other modifications described later are structured in the same way as light flux control member 5 employed in the embodiment already described except for in-groove-recess-portion 15. Therefore common reference numerals are used for common elements and repeated description is omitted.

Referring to FIG. 14, light flux control member 5 has ventilation grooves 19A, 19B on groove bottoms 191 at which first to eighth in-groove-recess-portions 15a to 15h are formed as second recess portion 15. Respective in-groove-recess-portions 15a to 15h have the same cross section configuration. Each of in-groove-recess-portions 15a to 15h has a circle-like plan shape.

That is, first in-groove-recess-portion 15a has a triangle-like cross section, including first slope 15a1 generally located on an extended part of straight line 25 running from emitting point 13 to opening edge 24 of recess portion 14. End portion 15a3 of first slope 15a1 is located at depth of w=0.1 mm from groove bottoms 191.

Second slope 15a2 provides a bridge portion connecting end portion 15a3 to groove bottoms 191, having a circle-like plan shape and being generally vertical to first slope 15a1. Second to eighth in-groove-recess portions 15b to 15h are formed as to be structured in the same way.

Examples of dimension and configuration data are as follows.

Radius r1 of recess portion 14; 1.5 mm
Depth ε of ventilation grooves 19A, 19B; 0.5 mm
Angle α of line 25 with respect to reference plane C; 19.5°
Angle θ of line 40 running through emitting point 13 and groove bottom side end edge 38 of second slope 15h2 of eighth in-groove-recess-portion 15h with respect to optical axis L; 78° or more Such light flux control member 5 gives a functional feature to emission device 11 employing the same as follows.

As shown in FIG. 15, incident light H of a large incidence angle (about half-intensity angle) to light flux control member 5 is slightly deflected by refraction as to come near to optical axis L, then being emitted from light flux control member 5 to be supplied to light diffusion member 7. This will bring a light gathering part with light H coming from recess portion 14.

However, the above refracted light H has a weak intensity (brightness) and the above light gathering part has a small area (corresponding to width of ventilation grooves 19A, 19B) as compared with light gathering area which would by brought in a case where light is incident to the whole area of back face 12 of light flux control member 5. Therefore the above light gathering part is avoided from looking conspicuous as viewed from the outside of emission face 8 of light diffusion member 8. It is noted that rays which comes from portions other than recess portion 14 and gathers on surface-to-be-illuminated 34 gives a high density would cause a conspicuous locally bright part on surface-to-be-illuminated 34 to appear, even if the respective rays of light H gathered are weak.

It is further to be noted that if a plurality of emission elements 4 are arranged and fluxes from respective emission elements 4 are mixed mutually, the above light gathering part on surface-to-be-illuminated 34 rendered to be inconspicuous ((See FIGS. 1 an 2).

After all, with emission device 11, surface light source device 2 and display 1 in accordance with the first modification, in-groove-recess-portions 15a to 15h can prevent quantity of light deflected as to come near to optical axis L in incidence to light flux control member 5 from increasing. As a result, similar advantages to advantages obtained by the embodiment previously described are obtained by emission device 11, surface light source device 2 and display in 1 accordance with the first modification (See FIGS. 1 and 2).

(Second Modification of Second Recess Portion)

Figure 16:
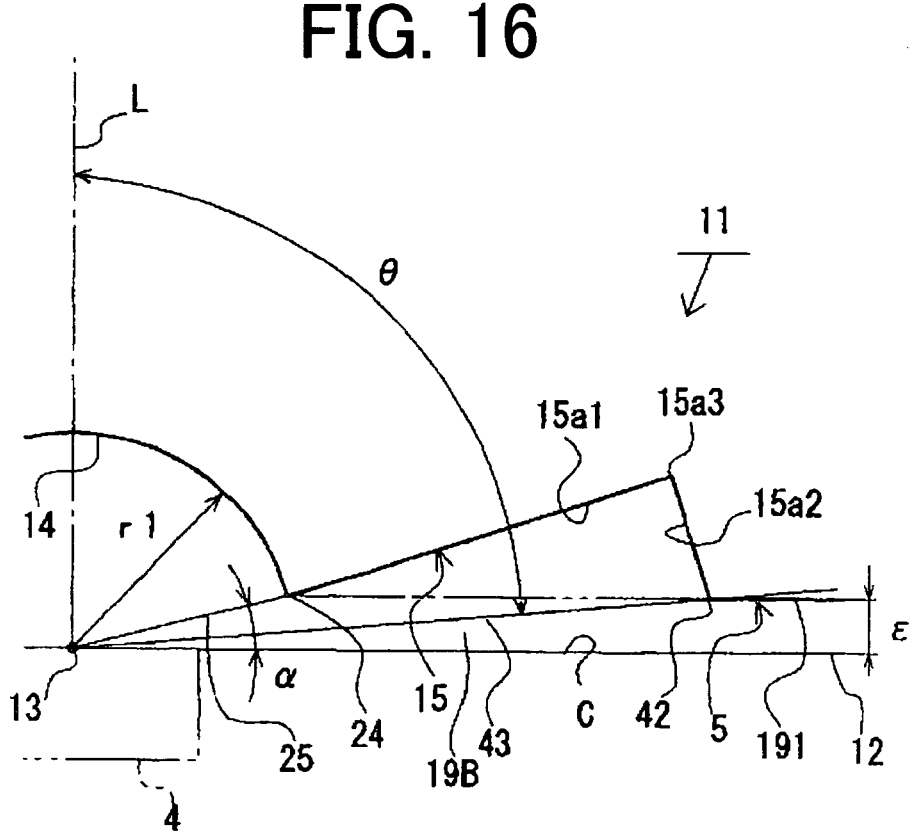
FIG. 16 illustrates a second modification of second recess portion, giving a partially enlarged cross section of a back side part of a light flux control member.
Figure 17:
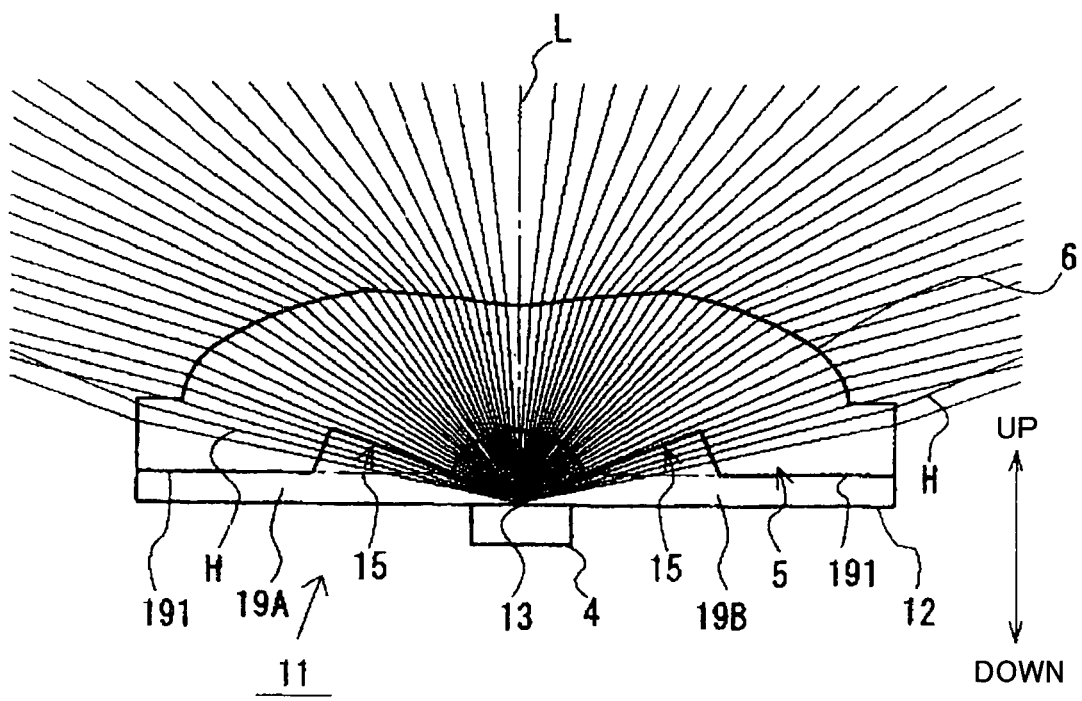
FIG. 17 is a diagram illustrating operation (state of causing light c from an light emitting element) of a light flux control member provided with the second recess portion of the second modification.

FIGS. 16 and 17 illustrate a second modification of in-groove-recess-portion (second recess portion) 15. Referring to FIG. 16, light flux control member 5 has a pair of ventilation grooves 19A, 19B on groove bottoms 191 at each of which a single in-groove-recess-portion 15 is formed. in-groove-recess-portion 15 has a circle-like plan shape.

In-groove-recess-portion 15 has a triangle-like cross section, including first slope 15a1 generally located on an extended part of straight line 25 running from emitting point 13 to opening edge 24 of recess portion 14. Second slope 15a2 provides a bridge portion connecting end portion 15a3 to groove bottoms 191, having a circle-like plan shape and being generally vertical to first slope 15a1.

Examples of dimension and configuration data are as follows.

Radius r2 of recess portion 14; 1.5 mm
Depth ε of ventilation grooves 19A, 19B; 0.5 mm
Angle α of line 25 with respect to reference plane C; 19.5°
Angle θ of line 43 running through emitting point 13 and groove bottom side end edge 42 of second slope 15a2 of in-groove-recess-portion 15 with respect to optical axis L; 78° or more In-groove-recess portion 15 has a configuration corresponding to a configuration obtained by enlarging first in-groove-recess portion 15a of light flux control member 5 employed in the first modification. In other words, the second modification is obtained by substitute first to eighth in-groove-recess portions 15a to 15h in the first modification with a single in-groove-recess portion 15.

According to this modification, as shown in FIG. 17, incident light H of a large incidence angle (about half-intensity angle) to light flux control member 5 is slightly deflected by refraction as to come near to optical axis L, then being emitted from light flux control member 5 to be supplied to light diffusion member 7. This will bring a light gathering part with light H coming from recess portion 14.

However, the above refracted light H has a weak intensity (brightness) and the above light gathering part has a small area (corresponding to width of ventilation grooves 19A, 19B) as compared with light gathering area which would by brought in a case where light is incident to the whole area of back face 12 of light flux control member 5. Therefore, in generally the same way as compared with the case of first modification, the above light gathering part is avoided from looking conspicuous as viewed from the outside of emission face 8 of light diffusion member 8.

It is further to be noted that if a plurality of emission elements 4 are arranged and fluxes from respective emission elements 4 are mixed mutually, the above light gathering part on surface-to-be-illuminated 34 rendered to be inconspicuous ((See FIGS. 1 an 2).

After all, with emission device 11, surface light source device 2 and display 1 in accordance with the first modification, in-groove-recess-portion 15 can prevent quantity of light deflected as to come near to optical axis L in incidence to light flux control member 5 from increasing. As a result, similar advantages to advantages obtained by the embodiment previously described are obtained by emission device 11, surface light source device 2 and display in 1 accordance with the first modification (See FIGS. 1 and 2).

(Third Modification of Second Recess Portion)

Figure 18:
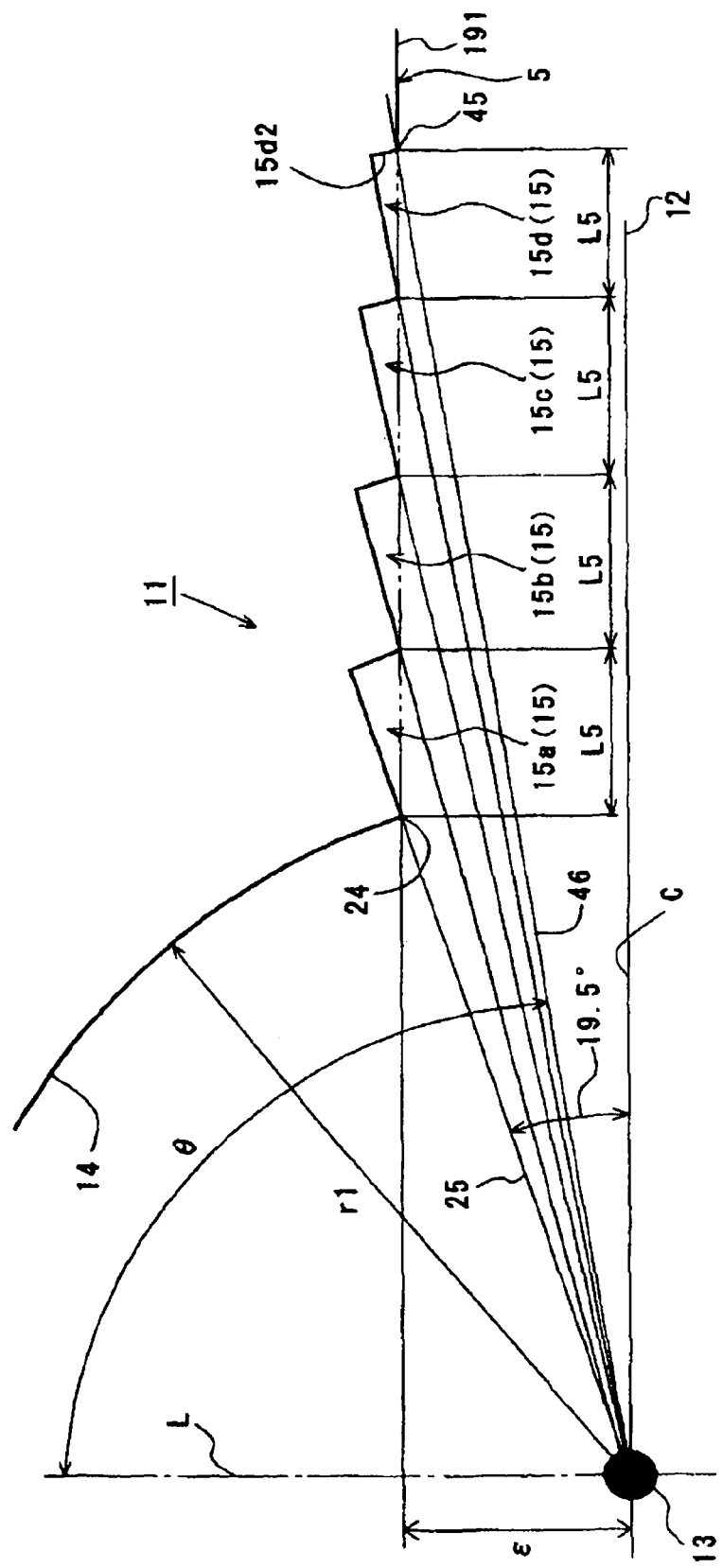
FIG. 18 illustrates a third modification of second recess portion, giving a partially enlarged cross section of a back side part of a light flux control member.

FIG. 18 illustrates a third modification of in-groove-recess-portion (second recess portion) 15. Referring to FIG. 18, light flux control member 5 has a plurality of in-groove-recess-portions 15a to 15d, each having a circle-like plan shape. In-groove-recess-portions 15a to 15d are formed successively (mutually connected in order) at a constant pitch L5 on groove bottoms 191 running radially outward from opening edge 24 of recess portion 14.

The outermost in-groove-recess portion 15d in in-groove-recess portions 15a to 15d has second slope 15d2, and groove bottom side end edge 45 of second slope 15d2 is located at generally the same position as the position of groove bottom side end edge 33 of second slope 15d2 of forth in-groove-recess portion 15d in the previously described embodiment.

Examples of dimension and configuration data are as follows.

Radius r1 of recess portion 14; 1.5 mm
Depth ε of ventilation grooves 19A, 19B; 0.5 mm
Angle α of line 25 with respect to reference plane C; 19.5°
Angle θ of line 46 running through emitting point 13 and groove bottom side end edge 45 of second slope 15d2 of in-groove-recess-portion 15d with respect to optical axis L; 78° or more With emission device 11 employing light flux control member 5 according to this modification, in-groove-recess-portions 15a to 15d restrain incident light to light flux control member 5 from producing inner-propagation rays coming nearer to optical axis L through refraction on incidence. Therefore, similar advantages to advantages obtained by the previously described embodiment or modifications. Further, similar advantages to advantages obtained by the previously described embodiment or modifications are obtained by surface light source device 2 and display 1 employing emission device 2 (See FIG. 2).

(Fourth Modification of Second Recess Portion)

Figure 19:
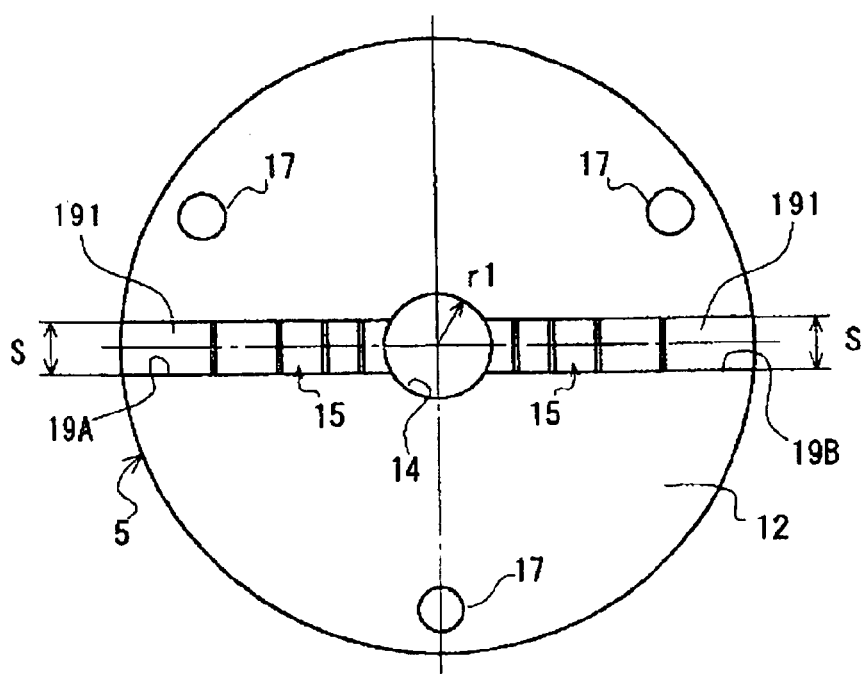
FIG. 19 illustrates a forth modification of second recess portion, showing a back side part of a light flux control member.

FIG. 19 illustrates a forth modification of in-groove-recess-portion (second recess portion) 15. Referring to FIG. 19, in-groove-recess-portion 15 light flux control member 5 has in-groove-recess-portions 15 are formed on groove bottoms 19 as to have shapes different from shapes like circles. The illustrated example shows line-like in-groove-recess-portions 15. It is noted that groove width S is preferably not greater than about ⅓ of diameter of recess portion 14 (i.e. 2×r1). That is, groove width S is preferably not greater than about (⅔)×r1 if such line-like in-groove-recess-portions 15 are employed.

(Other Modification of Second Recess Portion)

Further different modifications of second recess portion are allowed. In the case of light flux control member 5 employed in the above embodiment, in-groove-recess-portions (second recess portion) 15 have triangle-like cross sections, and each in-groove-recess-portion has first slope 15a1 generally vertical to second slope 15a2. Further, second slope 15a2 is inclined with respect to back face 12 (a general plane of back face 12) at an angle greater than another angle at which first slope 15a1 is inclined with respect to back face 12 (the general plane of back face 12). However, such matters do not limit the scope of the present invention.

For example, a plurality of independent recess portions may be formed instead of second recess portion 15 in the embodiment.

Such independent recesses may be cone-like recess portions or hemisphere-like recess portions. Alternatively, the above described in-groove-recess portions 15 may be substituted by recess portions each of which has a shape obtained by cutting away some small parts of in-groove-recess-portions.

Second in-groove-recess portions 15 formed on groove bottoms 191 of light flux control member 5 may be modified as shown in FIGS. 22a to 22f, wherein hemisphere-like recess portion 51 and cone-like recess portion 52 are illustrated.

FIG. 20a is a back face plan view of light flux control member 5 and FIG. 20b is an enlarged illustration of partial region 50 of an area surrounding recess portion 14 shown in FIG. 20a. FIG. 20c illustrates a cross section along X4-X4 in FIG. 20b, showing a cross section configuration of hemisphere-like recess portion 51 providing a second recess portion. FIG. 20d is a perspective of hemisphere-like recess portion 51.

Further, FIG. 20e illustrates a cross sections along X4-X4 in FIG. 20b, showing a cross section configuration of cone-like recess portion 52 providing a second recess portion. Finally, FIG. 20f is a perspective view of cone-like recess portion 52.

As shown in FIGS. 20a to 20f, second recess portion may be composed of a plurality of independent recess portions. Each of such independent recess portions may have a hemisphere-like configuration (hemisphere-like recess portion 51 shown in FIGS. 20c, 20d) or have a cone-like configuration (cone-like recess portion 52 shown in FIGS. 20e, 20f).

It can be said that hemisphere-like configuration is obtained by cutting away a part of sphere. The above cone-like configuration has an isosceles-like cross section.

Each second recess portion is allowed to have a cross section shape chosen of various shapes such as isosceles-like and arc-like. However, it is preferable that each of second recess portions is small enough to avoid a conspicuous "in-groove-bright-part" (i.e. locally bright part correspond to regions within ventilation grooves 19A, 19B) from being seen through light diffusion member 7.

Such a conspicuous in-groove-bright-part can be generated by a phenomenon that light coming from recess portion 14 is inner-incident to first slope 15a1 and is totally reflected there before reaching light control emission face 6. However, if second recess portion is small enough, only slight inner-incidence to first slope 15a1 occurs, resulting in being free from conspicuous in-groove-bright-part appearance.

Next, several modifications of ventilation grooves 19A, 19B are described.

<Modifications 1 to 3 of Ventilation Grooves>

Figure 21:
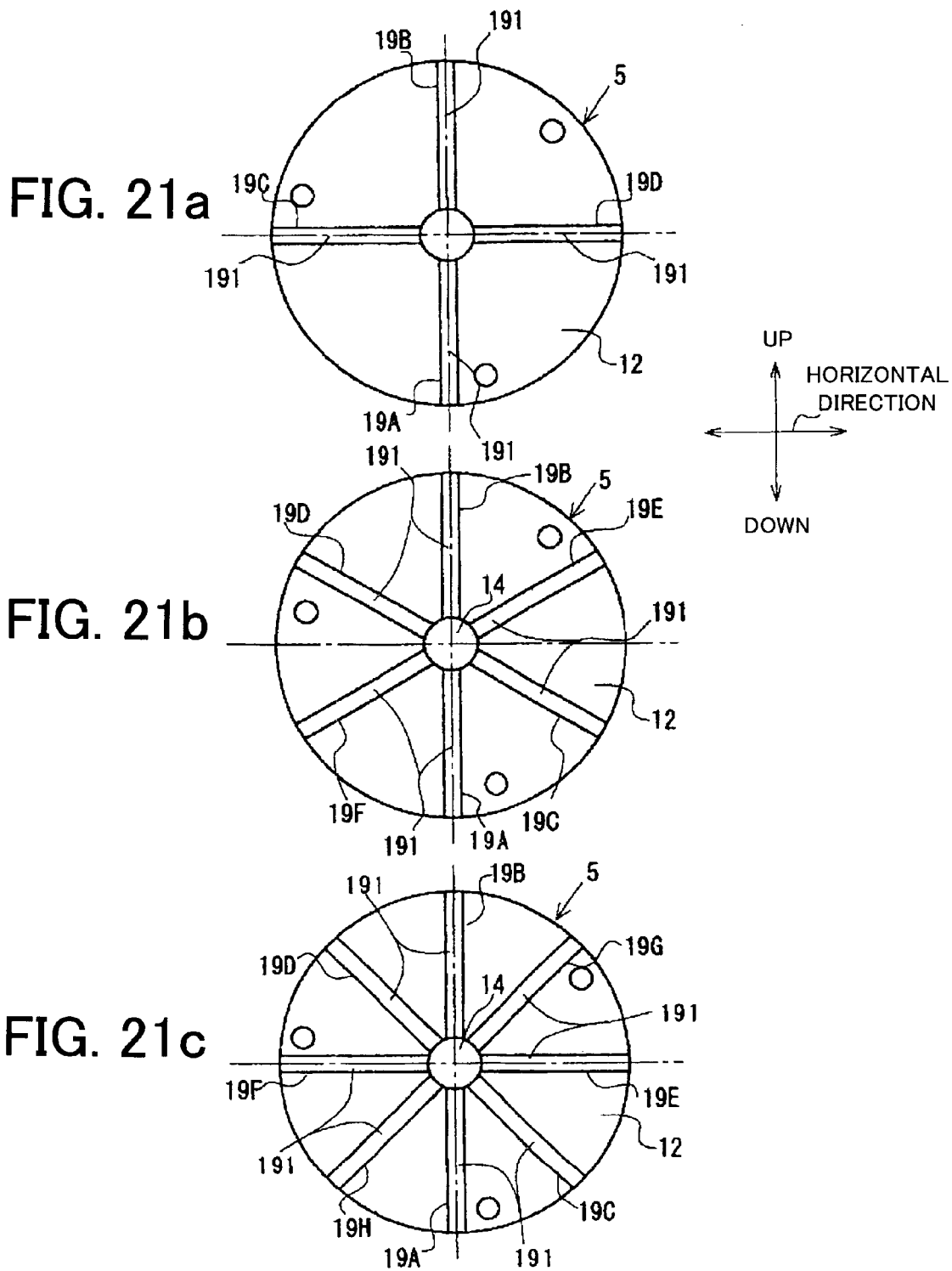
FIGS. 21a through 21c illustrate modifications of ventilation groove, FIG. 21a illustrating a back face of a light flux control member provided with ventilation grooves of a first modification, FIG. 21b illustrating a back face of a light flux control member provided with ventilation grooves of a second modification and FIG. 21c illustrating a back face of a light flux control member provided with ventilation grooves of a third modification.

In the first place, FIGS. 21a through 21c illustrate Modifications 1 to 3 of ventilation grooves 19A, 19B of light flux control member 5. Modifications 1 to 3 enable degree of freedom regarding mounting of light flux control member 5 to substrate 16 to be increased (See FIG. 7).

According to Modification 1 illustrated in FIG. 21a, ventilation grooves 19A to 19D are formed as to divide back face 12 into four equivalent parts along periphery direction. According to Modification 2 illustrated in FIG. 21b, ventilation grooves 19A to 19F are formed as to divide back face 12 into six equivalent parts along periphery direction. In addition, according to Modification 3 illustrated in FIG. 21c, ventilation grooves 19A to 19H are formed as to divide back face 12 into eight equivalent parts along periphery direction.

It is noted that every groove bottom 191 of ventilation grooves 19A to 19H is provided with any second recess portion (in-groove-recess-portion) 15 in accordance with any of the embodiment and modifications above described. In addition, depth and width of ventilation grooves 19A to 19H may be set in the same way as those of ventilation grooves 19A, 19B employed in the embodiment.

Light flux control member 5 shown in FIG. 21a can render at least one of ventilation grooves 19A to 19D inclined at 45° or more with respect to a horizontal direction even if light flux control member 5 is mounted in any posture to substrate 16 which is in standing-up posture. Therefore, temperature rising caused by switching-on of light emitting element 4 urges air within recess portion 14 to flow upward (natural convection of air). As a result, warmed air within recess portion 14 escapes to ambience of light flux control member 5 via at least one ventilation groove positioned at an upper side with respect to the horizontal direction (See FIG. 7).

On the other hand, ambient air flows into recess portion 14 via any ventilation groove(s) positioned at a lower side with respect to the horizontal direction (See FIG. 7). This decreases temperature within recess portion 14, enabling light flux control member 5, a surface of light emitting element 4 directed to recess portion 14 and substrate 16 to be cooled (See FIG. 7).

In a similar way, light flux control member 5 shown in FIG. 21*b* can render at least one of ventilation grooves 19A to 19F inclined at 60° or more with respect to a horizontal direction even if light flux control member 5 is mounted in any posture to substrate 16 which is in standing-up posture (See FIG. 7).

Therefore, light flux control member 5 shown in FIG. 21*b* in accordance with Modification 2 can effect cooling of air within recess portion 14 in the same way or more effectively as compared with light flux control member 5 shown in FIG. 21*a* in accordance with Modification 1.

Further, light flux control member 5 shown in FIG. 21*c* can render at least one of ventilation grooves 19A to 19G inclined at 75° or more with respect to a horizontal direction even if light flux control member 5 is mounted in any posture to substrate 16 which is in standing-up posture.

Accordingly light flux control member 5 shown in FIG. 21*c* in accordance with Modification 3 can effect cooling of air within recess portion 14 in the same way or more effectively as compared with light flux control members 5 shown in FIGS. 21*a* and 21*b* in accordance with Modifications 1 and 2, respectively.

It is noted that ventilation grooves 19A to 19G may be modified as to be different from the above-described embodiment and Modifications 1 to 3. For instance, more number of ventilation grooves may be formed by reducing groove width of each ventilation groove in Modification 3 so far as end portions, adjacent to recess portion 14, of the respective ventilation grooves are not in contact with each other. Further saying, groove depth may be changed depending on number of ventilation grooves formed.

<Modification 4 of Ventilation Grooves>

Figure 22:
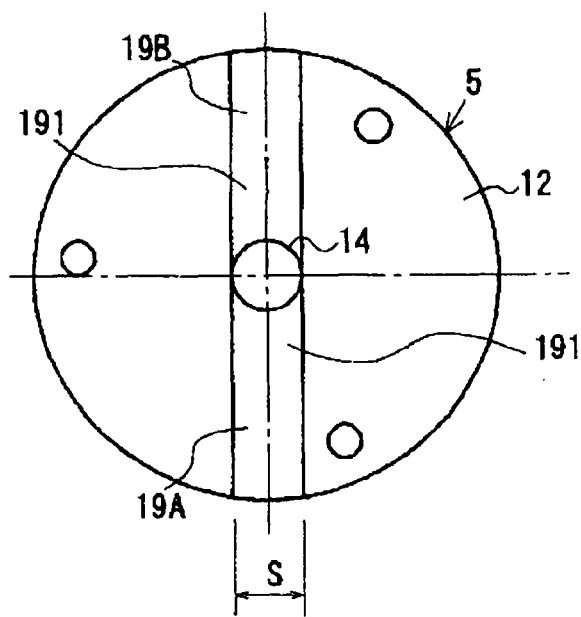
FIG. 22 illustrates a back face of a light flux control member provided with ventilation grooves of a forth modification.

FIG. 22 illustrates Modification 4 of ventilation grooves. According to Modification 4, ventilation grooves 19A, 19B employed in the embodiment are modified as to have groove width S equal to diameter of recess portion 14.

As shown in FIG. 22, although groove depth of ventilation grooves 19A, 19B is the same as that of ventilation grooves 19A, 19B employed in the embodiment, groove width S of ventilation grooves 19A, 19B is three times as large as that of ventilation grooves 19A, 19B employed in the embodiment. It is noted that this magnification (ratio) of "three" is a result of calculation under a condition such that groove width S of ventilation grooves 19A, 19B employed in the embodiment is 1 mm and radius of recess portion 14 employed in the embodiment is 1.5 mm. Further saying, groove bottoms 191 of ventilation grooves 19A, 19B are preferably provided with second recess portion 15 according to any of the embodiment and modifications described already.

Light flux control member 5 provided with such ventilation grooves 19A, 19B of Modification 4 can give a greater cross section to air flowing path provided by ventilation grooves 19A, 19B as compared with light flux control member 5 employed in the embodiment. Therefore more improved cooling action will be applied to air within recess portion 14. It is noted that groove width S may be set greater than diameter of recess portion 14 so far as changing (reduction) in illumination quality of light outputted from light flux control member 5 is not observed.

<Modification 5 of Ventilation Grooves>

Figure 23:
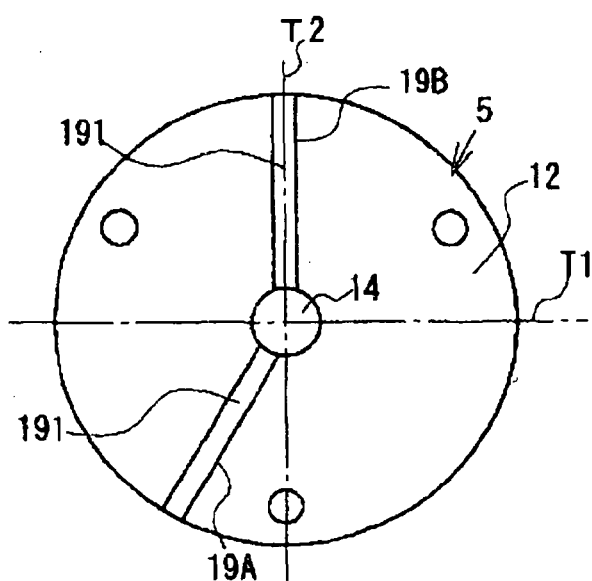
FIG. 23 illustrates a back face of a light flux control member provided with ventilation grooves of a fifth modification.

FIG. 23 illustrates Modification 5 of ventilation grooves. According to Modification 5, a pair of ventilation grooves 19A, 19B are not aligned on a straight line. That is, one of them 19B is formed along center line T2 running longitudinally and the other 19A is formed as to be angularly deviated from center line T2. It is noted that groove bottoms 191 of ventilation grooves 19A, 19B are preferably provided with second recess portion 15 according to any of the embodiment and modifications described already.

Ventilation grooves 19A and 19B in accordance with Modification 5 may be mutually asymmetric with respect to center line T2 running longitudinally and/or center line T1 running sideways. This renders obtaining of the optimum air flow path easy. The optimum air flow path will be determined depending on arrangement of fan (for supplying air flow; not shown) and components (not shown) to be disposed around light flux control member 5 easy.

<Modification 6 of Ventilation Grooves>

In the above-described embodiment, Modifications 1 to 4 of second recess portion and Modifications 1 to 5 of ventilation grooves, groove bottoms 191 are provided with second recess portion 15. However, no second recess portion 15 may be formed in some cases.

Such cases may include cases where illumination quality required is not so high. For example, if light flux control member 5 is used as optical components for advertising panels or road guidance panels. In general, such usages do not require illumination quality severely as compared with usages such as LCD-panels for television sets or personal computers.

According to this modification, point-like locally bright parts can appear in correspondence to locations of ventilation grooves 19A, 19B. However, such point-like locally bright parts are much smaller and inconspicuous than ring-like locally bright parts appearing as to surround optical axis L. In this sense, Modification 6 can provide an illumination performance superior to that provided by the arrangement shown in FIG. 10 in which back face 12 of light flux control member 5 is remote from surface 16*a* of substrate 16.

Figure 24A:
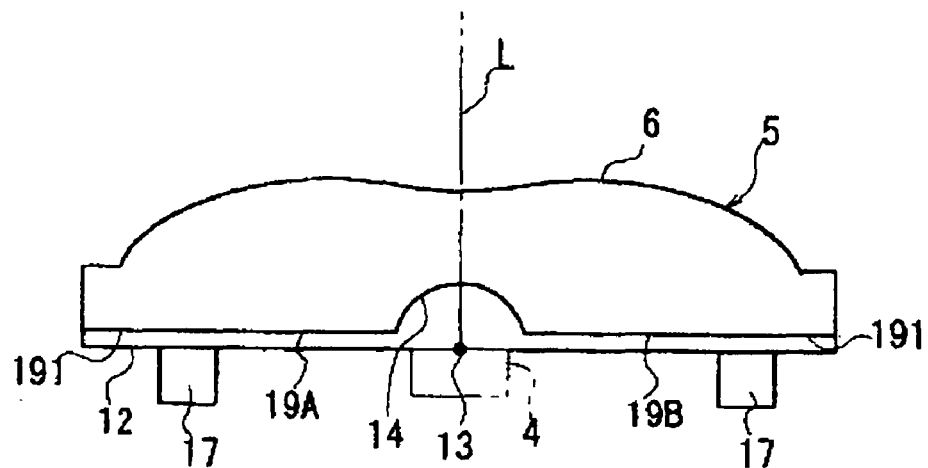
FIGS. 24a and 24b illustrate ventilation grooves of a sixth modification, FIG. 24a showing a cross section of a light flux control member provided with the same ventilation grooves (a cross section view illustrated in a similar way to FIG. 4b) and FIG. 24b showing a back face of the same light flux control member.
Figure 24B:
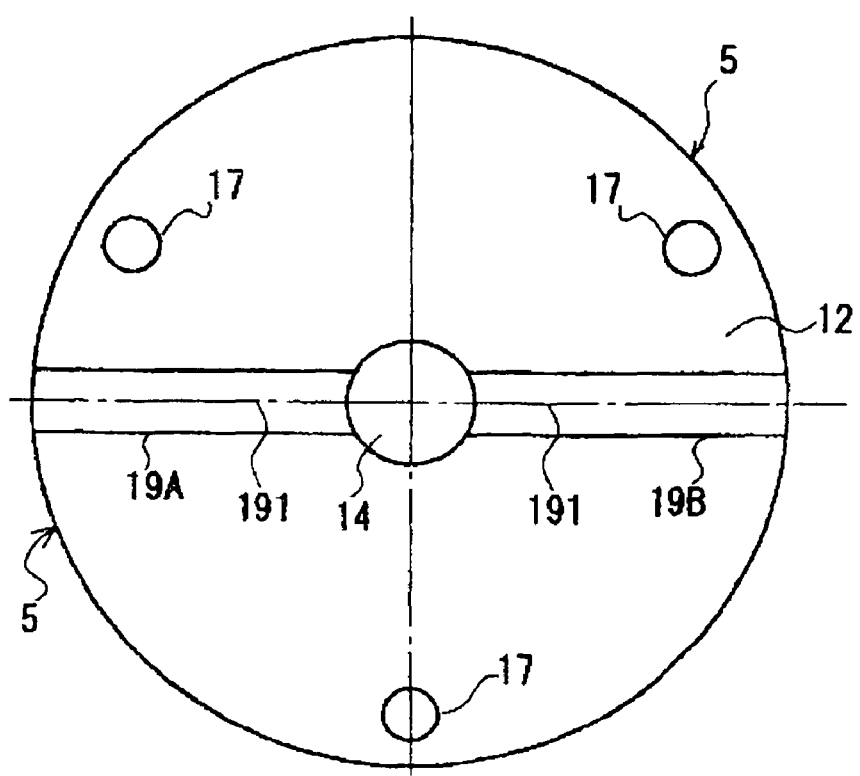

In addition, if light flux control member 5 shown in FIG. 24 is applied to usages such as LCD-panels for television sets or personal computers which require a high illumination quality, it is preferable to improve evenness of brightness, for example, by adjusting thickness of light diffusion member 7.

<Modification 7 of Ventilation Grooves>

In the above-described embodiment, Modifications 1 to 4 of second recess portion and Modifications 1 to 6 of ventilation grooves, ventilation grooves 19 (19A to 19H) of light flux control members 5 are configured as to look like rectangles as viewed sideways (For instance, see FIG. 5). However, this do not limit the scope of the present invention.

Figure 25:
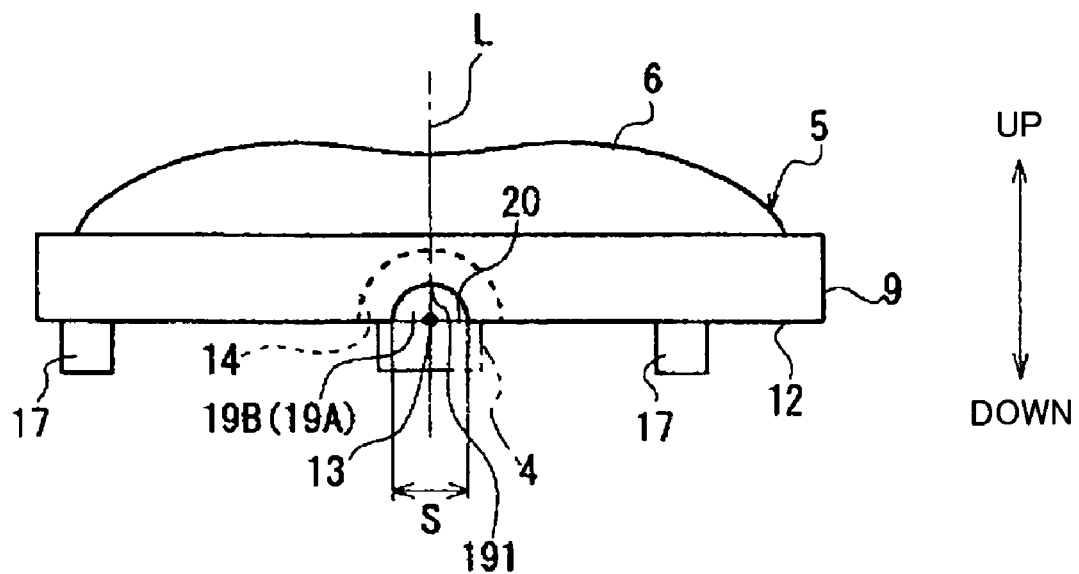
FIG. 25 illustrates ventilation grooves of a seventh modification, giving a side view of a light flux control member provided with the same ventilation grooves illustrated in a similar way to FIG. 5.

For example, arc-like configuration in accordance with Modification 7 as shown in FIG. 25 may be employed.

If such arc-like configuration is employed, groove bottoms of ventilation grooves work like concave lenses. Therefore some light is diverged by groove bottoms, with the result that locally bright parts are restrained from appearing under a condition such that no second recess portion 15 is formed on the groove bottoms.

It is noted that such convex lens effect is weak if groove width S of ventilation grooves 19 is large and accordingly curvature is small. To avoid influence of this from appearing, second recess portion 15 is preferably formed on the groove bottoms in order to restrains refraction from producing rays coming near to optical axis L.

<Modification 8 of Ventilation Grooves>

In the above-described embodiment, Modifications 1 to 4 of second recess portion and Modifications 1 to 7 of ventilation grooves, ventilation grooves 19 (19A to 19H) of light flux control members 5 are configured as to have a constant groove depth. However, this do not limit the scope of the present invention. For example, groove depth changing depending on distance from recess portion 14 may be employed.

Figure 26:
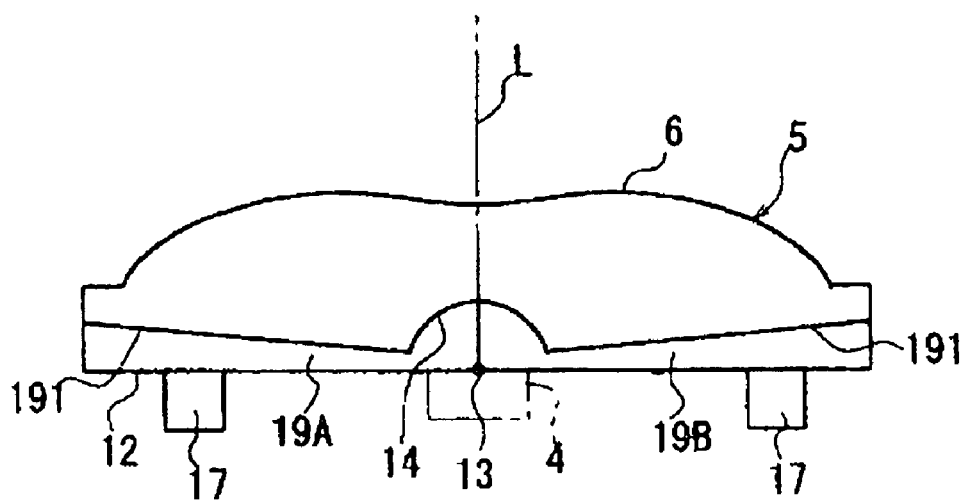

According to Modification 8 shown in FIG. 26, groove depth gets larger with increasing distance from recess portion 14. This renders air introduction into recess portion 14 aided by a fan easy, promoting in effective cooling.

<Modification 9 of Ventilation Grooves>

In the above-described embodiment, Modifications 1 to 4 of second recess portion and Modifications 1 to 8 of ventilation grooves, ventilation grooves 19 (19A to 19H) of light flux control members 5 are configured as to have a constant groove width S. However, this do not limit the scope of the present invention. For example, groove width S changing depending on distance from recess portion 14 may be employed.

Figure 27:
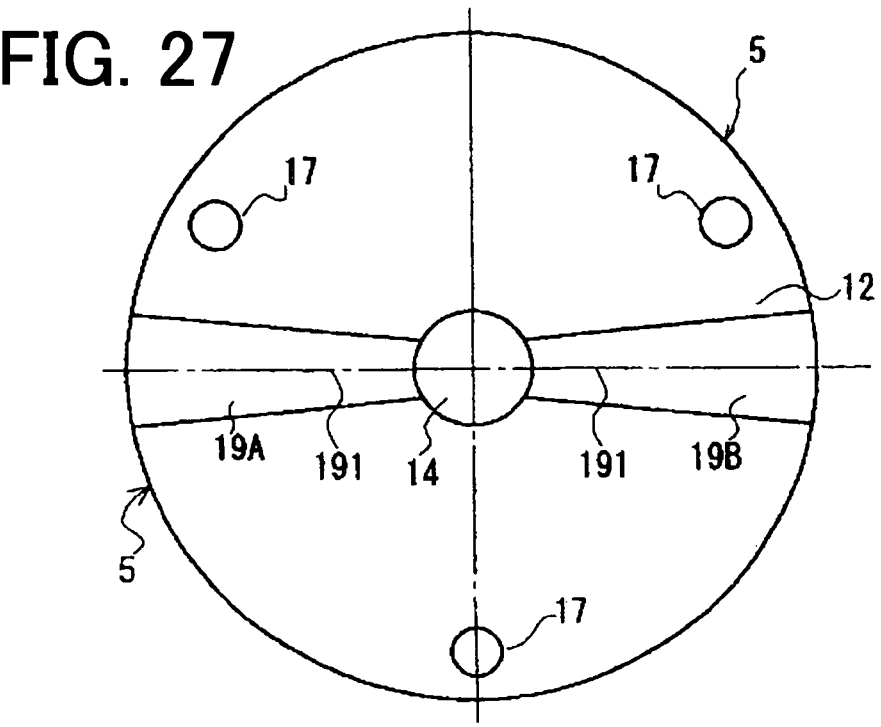
FIG. 27 illustrates ventilation grooves of a ninth modification, showing a back face of a light flux control member provided with the same ventilation grooves illustrated in a similar way to FIG. 24b.
Figure 28:
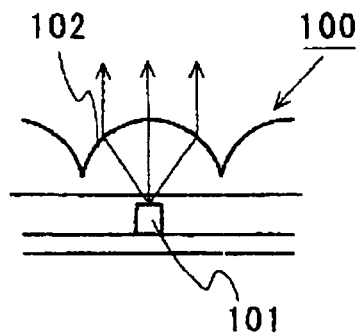
FIG. 28 is a diagram illustrating structure in accordance with a first prior art.
Figure 29:
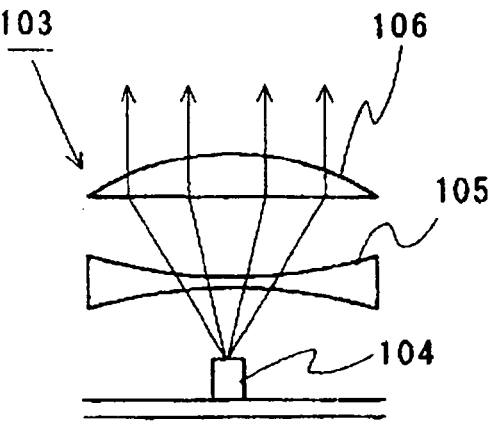
FIG. 29 is a diagram illustrating structure in accordance with a second prior art.
Figure 30:
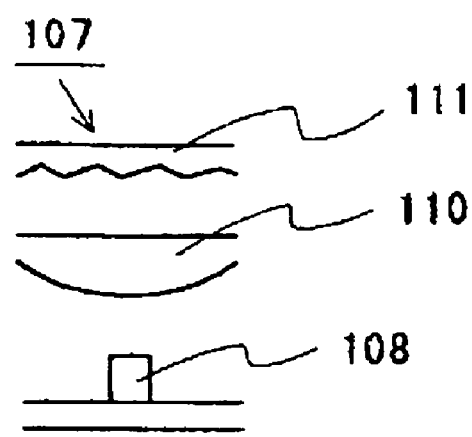
FIG. 30 is a diagram illustrating structure in accordance with a third prior art.

According to Modification 9 shown in FIG. 27, groove width S gets larger with increasing distance from recess portion 14. This ensures effects like those obtained in the case of Modification 8.

(Other Modifications of Light Flux Control Member)

The above-described embodiment and various modifications do not limit the scope of the present invention. For example, the following modifications are allowed.

(1) Light control emission face 6 of light flux control member 5 may be a micro-unevenness surface or matted surface to diffuse light on emitting.

(2) Light flux control member 5 may be formed of a material containing light diffusing fine particles such as silicone particles or titan oxide particles.

(3) According to the above-described embodiment, light flux control member 5 has light emission control face 6 including first and second emission faces 6a and 6b which are connected with each other at inflection point Po, and hemisphere-like recess portion 14 is employed. However, this do not limit the scope of the present invention.

In general, configuration of light emission control face 6 may be modified variously so far as emission from light emission control face 6 does not cause an surface-to-be-illuminated to have abnormal bright part.

For example, light emission control face 6 may be configured as to provide a piece of curved surface like that corresponding to an emission face of LED-chip 125 as shown in FIG. 31 and recess portion 14 may be configured as to sink like a shell for cannon (having a tapered top portion).

After all, according to the present invention, "ventilation grooves 19 (19A to 19H)" or "ventilation grooves 19 (19A to 19H) and second recess portion 15" are formed on light flux control member 5 provided with recess portion 14 and light emission control face 6 which are adjusted so that the area of region, which is a part of surface-to-be-illuminated and irradiated by fluxes originating from fluxes near to optical axis L on being outputted from light emitting element 4, can be expanded. Thus the present invention provides emission faces, surface light source devices and displays provided with light flux control member 5 performing an excellent heat releasing effect and light control effect.

The invention claimed is:

1. An emission device comprising:
a light emitting element, a substrate for mounting said light emitting element and a light flux control member through which light of said light emitting element is outputted, wherein
said light flux control member has a light control emission face controlling light outputting and a back face which is opposite to and in contact with said substrate,
said back face being provided with a first recess portion which has an opening edge and is formed at a location corresponding to said light emitting element as to taking light of said light emitting element into said light flux control member and at least two ventilation grooves which provides a sink extending from said first recess portion radially outward along said back face so that said first recess portion communicates with ambiance, and,
said light control emission face being configured as to meet a condition at least regarding light emitted in a direction range which is within 75° from a maximum intensity light emission direction of said light emitting element,
said condition being that increasing quantity of θ5 relative to increasing quantity of θ1, Δθ5/Δθ1 is larger for light in an angle region near to the reference optical axis as compared with Δθ5/Δθ1 for light in an angle region remote from the reference optical axis, under definition such that θ1 is angle of a travelling direction of light within said direction range, on reaching a reaching point on said light control emission face after incidence to said light flux control member, with respect to a line parallel with a reference optical axis of said emission device and emission angle θ5 is angle of emission from said light control emission face.

2. An emission device in accordance with claim 1, wherein said light control emission face includes a ring-like first emission face which is near to said reference optical axis and concentric with respect to said reference optical axis and a second emission face which is adjacent to and surrounds said first emission face, a connection part between said first emission face and said second emission face corresponding to a point of inflection of said light control emission face.

3. An emission device in accordance with claim 1, wherein said ventilation grooves are configured as to have a rectangle-like cross section shape on a plane perpendicular to both a ventilation groove running direction and said back face.

4. An emission device in accordance with claim 1, wherein said ventilation grooves are configured as to have an arc-like cross section shape on a plane perpendicular to both a ventilation groove running direction and said back face.

5. An emission device in accordance with claim 1, wherein said ventilation grooves have a constant depth from an inner end portion at a side of said first recess portion to an outer end portion at a side of ambience as to have groove bottoms parallel with said back face.

6. An emission device in accordance with claim 1, wherein said light emission control face is configured as to meet the following conditions (A) to (C) so far as angularly out of a neighbour of said reference optical axis, (A) {θ5/θ1}>1 is satisfied;
(B) θ5 gets larger with increasing of θ1, and
(C) increasing quantity of θ5 relative to increasing quantity of θ1 gets smaller as θ1 gets larger.

7. An emission device in accordance with claim 1, wherein said groove bottoms of said ventilation grooves have a second recess portion provided with a circle-like plan shape having a center according with said reference optical axis, said second recess portion being configured as to prevent light of said light emitting element from being refracted as to come nearer to said reference optical axis on incidence to said second recess portion.

8. An emission device in accordance with claim 7, wherein said second recess portion is configured as to meet the following conditions (1) to (4), (1) said second recess portion has a triangle-like sink cross section shape on a plane which includes said reference optical axis and passes said outer end portion;
(2) said second recess portion consists of a first slope and a second slope, said first slope being provided with a circle-like plan shape, being near to said first recess portion and being inclined so that sink quantity with respect to said groove bottoms gets greater gradually with an increasing distance from said recess portion;
(3) said second slope is provided with a circle-like plan shape, remote from said first recess portion and bridges an end portion of said first slope to said groove bottoms;
(4) said first slope is cross-section-configured on said plane as to accord with or sharper than an inclined line passing an light emitting center of said light emitting element and the other end portion of said first slope so that light of said light emitting element is not hindered from being incident to said second slope on reaching said second recess portion.

9. An emission device in accordance with claim 1, wherein said groove bottoms of said ventilation grooves have a second recess portion provided with a surface for taking light of said light emitting element into said light flux control member, said second recess portion being configured as to prevent light of said light emitting element from being refracted as to come nearer to said reference optical axis on incidence to said second recess portion.

10. An emission device in accordance with claim 9, wherein said second recess portion is configured as to meet the following conditions (1) to (4),
(1) said second recess portion has a triangle-like sink cross section shape on a plane which includes said reference optical axis and passes said outer end portion;
(2) said second recess portion consists of a first slope and a second slope for taking light of said light emitting element into said light flux control member, said first slope being near to said first recess portion and being inclined so that sink quantity with respect to said groove bottoms gets greater gradually with an increasing distance from said recess portion;
(3) said second slope is remote from said first recess portion and bridges an end portion of said first slope to said groove bottoms;
(4) said first slope is cross-section-configured on said plane as to accord with or sharper than an inclined line passing an light emitting center of said light emitting element and the other end portion of said first slope so that light of said light emitting element is not hindered from being incident to said second slope on reaching said second recess portion.

11. An emission device in accordance with claim 8, wherein said first slope is cross-section-configured on said plane as to accord with an inclined line passing an light emitting center of said light emitting element and the other end portion of said first slope, and
said second slope is formed as to be generally perpendicular to said first slope.

12. An emission device in accordance with claim 10, wherein said first slope is cross-section-configured on said plane as to accord with an inclined line passing an light emitting center of said light emitting element and the other end portion of said first slope, and
said second slope is formed as to be generally perpendicular to said first slope.

13. An emission device in accordance with claim 8, wherein a plurality of said second recess portions are formed successively along said ventilation grooves from an opening edge of said first recess portion near to said groove bottoms,
said second recess portions, except for the innermost second recess portion adjacent to said opening edge of said first recess portion near to said groove bottoms, being configured the same as or similarly to said or the innermost second recess portion.

14. An emission device in accordance with claim 10, wherein a plurality of said second recess portions are formed successively along said ventilation grooves from an opening edge of said first recess portion near to said groove bottoms,
said second recess portions, except for the innermost second recess portion adjacent to said opening edge of said first recess portion near to said groove bottoms, being configured the same as or similarly to said or the innermost second recess portion.

15. An emission device in accordance with claim 11, wherein a plurality of said second recess portions are formed successively along said ventilation grooves from an opening edge of said first recess portion near to said groove bottoms,
said second recess portions, except for the innermost second recess portion adjacent to said opening edge of said first recess portion near to said groove bottoms, being configured the same as or similarly to said or the innermost second recess portion.

16. An emission device in accordance with claim 12, wherein a plurality of said second recess portions are formed successively along said ventilation grooves from an opening edge of said first recess portion near to said groove bottoms,
said second recess portions, except for the innermost second recess portion adjacent to said opening edge of said first recess portion near to said groove bottoms, being configured the same as or similarly to said or the innermost second recess portion.

17. A surface light source device comprising:
an emission device; and
a light diffusion member diffusing and transmitting light outputted from said emission device, wherein said emission device is a emission device in accordance with claim 1.

18. A display comprising:
a surface light source device; and
an object-to-be-illuminated for displaying illuminated by light outputted from said surface light source device, wherein said surface light source device 2 is a surface light source device in accordance with claim 1.

* * * * *

UNITED STATES PATENT AND TRADEMARK OFFICE
CERTIFICATE OF CORRECTION

PATENT NO. : 7,866,844 B2
APPLICATION NO. : 12/380000
DATED : January 11, 2011
INVENTOR(S) : Masao Yamaguchi It is certified that error appears in the above-identified patent and that said Letters Patent is hereby corrected as shown below:

Column 9, Line 46 delete "emitting point" and insert -- "emitting point" --, therefor.

Column 13, Line 31 delete "θ3=tan$^{31\ 1}$" and insert -- θ3=tan$^{-1}$ --, therefor.

Column 17, Line 60, delete "control," and insert -- control --, therefor.

Signed and Sealed this
Nineteenth Day of April, 2011

David J. Kappos
*Director of the United States Patent and Trademark Office*